United States Patent [19]

Christian et al.

[11] Patent Number: 5,361,398
[45] Date of Patent: Nov. 1, 1994

[54] METHOD AND APPARATUS FOR TRANSMISSION PATH DELAY MEASUREMENTS USING ADAPTIVE DEMODULATION

[75] Inventors: Paul R. Christian, Schaumburg; Casimir Karczewski, Lake Villa, both of Ill.

[73] Assignee: Motorola, Inc., Schaumburg, Ill.

[21] Appl. No.: 10,910

[22] Filed: Jan. 29, 1993

[51] Int. Cl.$^5$ .............................................. H04B 7/00
[52] U.S. Cl. ................................. 455/51.2; 455/67.6; 375/107
[58] Field of Search ..................... 455/51.2, 67.1, 67.6, 455/69; 375/107

[56] References Cited

U.S. PATENT DOCUMENTS

| | | |
|---|---|---|
| 4,696,051 | 9/1987 | Breeden . |
| 4,696,052 | 9/1987 | Breeden . |
| 4,718,109 | 1/1988 | Breeden et al. . |
| 4,721,955 | 1/1988 | Dunkerton et al. . |
| 4,803,703 | 2/1989 | DeLuca et al. . |
| 5,014,344 | 5/1991 | Goldberg . |
| 5,038,403 | 8/1991 | Leitch ................................. 455/51.2 |
| 5,077,759 | 12/1991 | Nakahara ............................ 455/67.6 |
| 5,212,807 | 5/1993 | Chan ................................... 455/67.6 |
| 5,257,404 | 10/1993 | Goreham et al. .................. 455/51.2 |

FOREIGN PATENT DOCUMENTS 0197556 10/1986 European Pat. Off. .
0198448 10/1986 European Pat. Off. .

Primary Examiner—Reinhard J. Eisenzopf
Assistant Examiner—Andrew Faile
Attorney, Agent, or Firm—Philip P. Macnak; Thomas G. Berry

[57] ABSTRACT

A simulcast transmission system (100) utilizes adaptive demodulation to provide a method and apparatus for automatic delay equalization measurements. The simulcast transmission system (100) comprises a control station (101), and a plurality of remote transmission stations (201, 301) capable of re-transmitting a received delay equalization measurement signal which includes at least a correction bit pattern signal followed by a synchronization pattern signal. The control station (101) comprises a transmitter (131, 181) which transmits the delay equalization measurement signal, a receiver (151, 191) which receives the re-transmitted delay equalization measurement signal, a correlator (115, 762) which correlates the received synchronization pattern signal to obtain a coarse time of reception, a correction bit pattern analyzer (115, 776–802) which analyzes the received correction bit pattern signal to derive a fine reception time correction factor, and a time corrector (115, 804) which corrects the coarse time of reception with the fine reception time correction factor to obtain a corrected time of reception of the delay equalization measurement signal at the control station (101).

35 Claims, 14 Drawing Sheets

METHOD AND APPARATUS FOR TRANSMISSION PATH DELAY MEASUREMENTS USING ADAPTIVE DEMODULATION

BACKGROUND OF THE INVENTION

1. Field of the Invention

The present invention relates generally to the field of audio delay equalization in simulcast transmission systems, and more particularly to a method and apparatus for transmission path delay measurements using adaptive demodulation.

2. Description of the Prior Art

Simulcast transmission systems are widely used to distribute information, such as voice messages and numeric or alphanumeric data messages within paging systems, or data messages within data communication systems, such as in information service systems. In order for simulcast transmission systems to reliably distribute information throughout the system, precise control and optimization of transmission path delays between the originating equipment and the receiving equipment is required. In many prior art simulcast transmissions systems, this has previously been achieved by equipping all fixed base station equipment with analog or digital delay lines capable of equalizing the different control path delays between the base station equipment and control station equipment. In some of the prior art simulcast systems, the delay lines have been manually set based on air mileage calculations and rough delay estimates, and as a result, typically have provided limited delay equalization due to the reliance on poor phase delay estimates. Many simulcast transmission systems have also relied on a volatile control path medium, such as telephone lines for distribution of information between the base station equipment and control station equipment. As a consequence, a number of methods for providing automatic phase delay equalization have been proposed and implemented to regularly equalize ever changing transmission path delays. When automatic equalization methods are utilized, however, the delay measurement apparatus must be tolerant of the common telephone and RF path impairments which are encountered, such as random noise, group delay distortion, phase jitter, impulse response and harmonic distortion. Prior art automatic delay equalization equipment, however, has been plagued by poor performance over realistic transmission media and has typically failed to work under extreme conditions. In particular, many of the prior art methods have attempted to derive accurate timing information from an analog signal's zero crossings, while extracting coarse timing information from tone frequency transitions. Unfortunately, the correlation between the time domain and the frequency domain is inexact and subject to large inaccuracies, as much as half to full cycles of the analog tone in the final measurement due to group delay distortion on the transmission channel. Thus what is needed to provide reliable automatic transmission path delay measurements and phase delay equalization is a method and apparatus for providing extremely accurate measurements under ideal conditions, and very accurate measurements under extreme conditions. The method and apparatus must also be capable of distinguishing an extremely poor measurement from an adequate measurement, thus minimizing false readings during the transmission delay measurement process.

SUMMARY OF THE INVENTION

In accordance with one aspect of the present invention, within a simulcast communication system which comprises a control station and a plurality of transmission stations, a method for measuring transmission path delays between the control station and the plurality of transmission stations comprises the steps of:

transmitting from the control station a delay equalization measurement signal including at least a correction bit pattern signal followed by a synchronization pattern signal, receiving at a selected one of the plurality of transmission stations the delay equalization measurement signal and transmitting the delay equalization measurement signal from the selected transmission station, receiving the delay equalization measurement signal transmitted from the selected transmission station at the control station, correlating the received synchronization pattern signal to obtain a coarse time of reception of the delay equalization measurement signal at the control station, analyzing the received correction bit pattern signal to derive a fine reception time correction factor, and correcting the coarse time of reception with the fine reception time correction factor to obtain a corrected time of reception of the delay equalization measurement signal at the control station.

In accordance with another aspect of the present invention, a simulcast transmission system utilizes adaptive demodulation to provide automatic delay equalization measurement. The simulcast transmission system comprises at least one remote base station capable of re-transmitting a received delay equalization measurement signal which includes at least a correction bit pattern signal followed by a synchronization pattern signal to a control station, a transmitter for transmitting the delay equalization measurement signal. The control station comprises a receiver for receiving the re-transmitted delay equalization measurement signal, a means for correlating the received synchronization pattern signal to obtain a coarse time of reception thereof, means for analyzing the received correction bit pattern signal to derive a fine reception time correction factor, and means of correcting the coarse time of reception with the fine reception time correction factor to obtain a corrected time of reception of the delay equalization measurement signal at the base station.

In accordance with another aspect of the present invention, within a simulcast communication system which comprises a control station and a plurality of transmission stations, a method for measuring transmission path delays between the control station and the plurality of transmission stations comprises the steps of:

transmitting from the control station at predetermined transmission times established by the master clock, a delay equalization measurement signal including at least a correction bit pattern signal followed by a synchronization pattern signal;

receiving the delay equalization measurement signal at the plurality of transmission stations;

correlating the received synchronization pattern signal to obtain a coarse time of reception established by the slave clocks at the plurality of transission stations;

analyzing the received correction bit pattern signal to derive a fine reception time correction factor;

adjusting the coarse time of reception established by the slave clocks by the fine reception time correction factor to obtain an adjusted time of reception of the delay equalization measurement signal established by the slave clocks;

comparing the adjusted time of reception established by the slave clocks with the predetermined transmission time established by the master clock corresponding thereto, to derive a clock time offset; and correcting the time established by the slave clocks by the derived clock time offsets and an airtime correction factor, to synchronize the slave clocks at the transmission stations with the master clock at the control station.

In accordance with another aspect of the present invention, a simulcast transmission system utilizes adaptive demodulation to provide automatic delay equalization measurement. The simulcast transmission system comprises a control station and a plurality of transmission stations. The control station comprises a master clock for generating timing signals, and a transmitter responsive to the timing signals for transmitting a delay equalization measurement signal which includes at least a correction bit pattern signal followed by a synchronization pattern signal at predetermined transmission times. The plurality of transmission stations comprise slave clocks for generating timing signals, receivers responsive to the timing signals for receiving the transmitted delay equalization measurement signal, correlators responsive to the timing signals for correlating the received synchronization pattern signal to obtain a coarse time of reception established by the slave clocks, analyzers for analyzing the received correction bit pattern signal to derive a fine reception time correction factor, means for adjusting the coarse time of reception established by the slave clocks with the fine reception time correction factor to obtain an adjusted time of reception of the delay equalization measurement signal established by the slave clocks, comparators for comparing the adjusted time of reception established by the slave clocks with the predetermined transmission time established by the master clock corresponding thereto to derive a clock time offset, and time correctors for correcting the time established by the slave clocks by the derived clock time offsets and an airtime correction factor, to synchronize the slave clocks at the transmission stations with the master clock at the control station.

A communication receiver providing pseudo-synchronous demodulation for use in a communication system which transmits an information signal which includes at least a first timing portion followed by a second information portion comprises a receiver for receiving the transmitted information signal, a detector for detecting transitions within the timing portion, and for determining arrival times thereof, an average bit edge calculator for computing an average bit edge arrival time for a predetermined number of arrival times determined, a sample point calculator for computing a sampling point related to the average bit edge arrival time, and a sampler for sampling the received second information portion to detect the information contained therein.

DESCRIPTION OF THE PREFERRED EMBODIMENT

Figure 1:
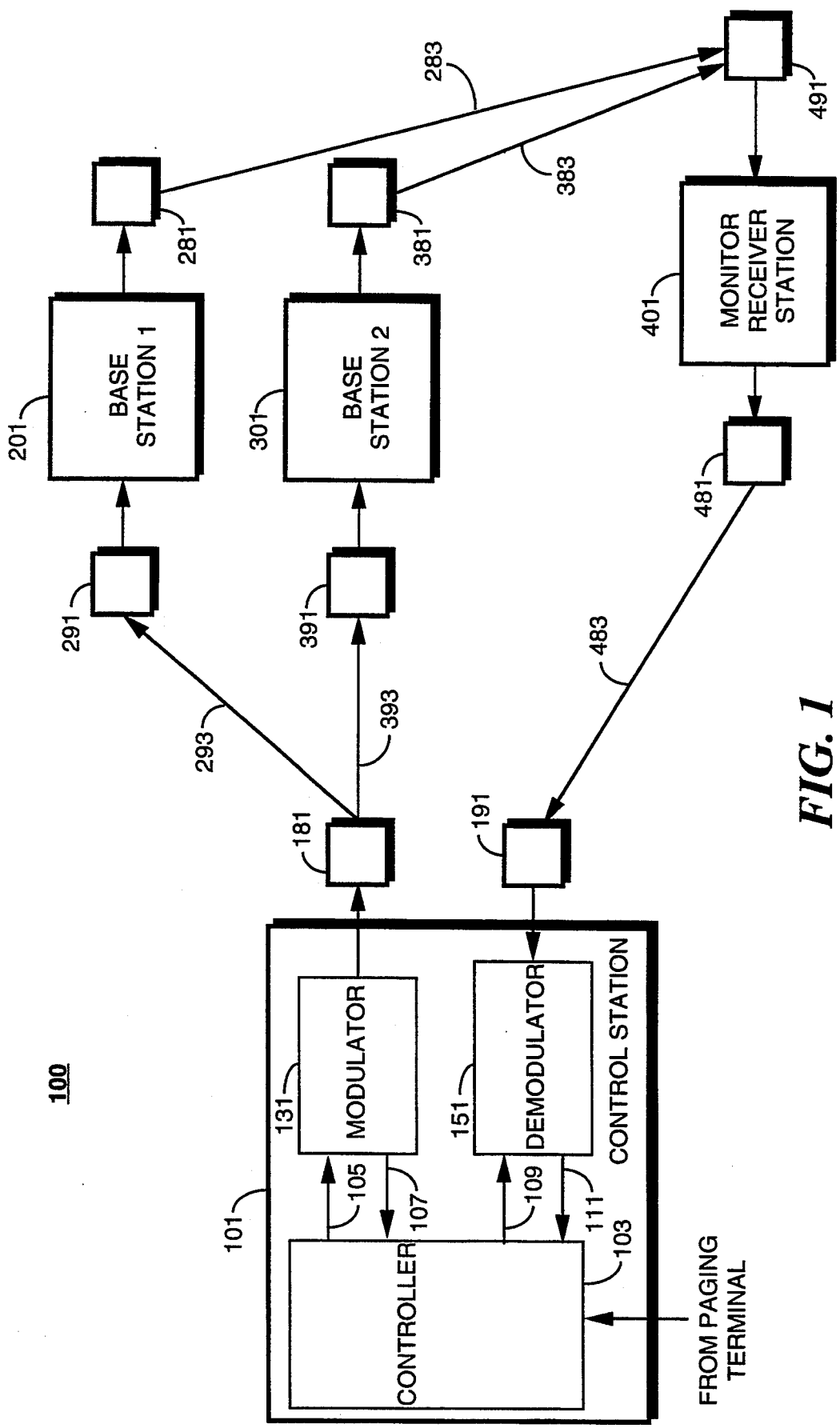
FIG. 1 is an electrical block diagram of a simulcast transmission system using adaptive demodulation for transmission path delay measurements in accordance with the preferred embodiment of the present invention.

Referring to the Figures, FIG. 1 is an electrical block diagram of a simulcast transmission system 100 using adaptive demodulation for transmission path delay measurements in accordance with the preferred embodiment of the present invention. As shown in FIG. 1, the simulcast transmission system 100 comprises a control station 101 and a plurality of transmission stations 201, 301. While only two transmission stations are shown, it will be appreciated that additional transmission stations can be utilized to provide a greater coverage area within the simulcast transmission system.

The control station 101 comprises a controller 103 for controlling the distribution of information, such as transmitter control information, voice messages, numeric and alphanumeric messages, and delay equalization measurement information throughout the simulcast transmission system, as will be described below. The controller 103 receives information for transmission from such information inputting devices as a paging terminal (not shown), in a manner well known to one of ordinary skill in the art, and couples the information to be transmitted to a modulator 131 through data input 105, and also receives operational status information, such as output level information, from status output 107. The modulator 131 modulates the information in an appropriate modulation format for transmission, as will be described below. The controller 103 also couples to a demodulator 151 which couples demodulated information to the controller 103 via a data output 111 under the control of the controller 103 via control input 109. The information modulated by modulator 131 is coupled to transmission means 181 which transmits the modulated information over communication links 293, 393 to receiving means 291, 391, the outputs of which then couple to modulation inputs of base stations 201, 301, respectively. Transmission means 181, communication links 293, 393 and receiving means 291, 391 provide an information distribution network throughout the simulcast transmission system, and are implemented using any of a number of well known information distribution technologies, such as line drivers communicating over telephone lines, link transmitter/receivers communicating over RF links, microwave transmitters/receivers communicating over microwave links, or satellite transmitter/receivers communicating over satellite transmission links, or any combination of the above. It will also be appreciated that other distribution technologies such as fiber optic communication can be utilized as well.

Voice messages and numeric and alphanumeric information are transmitted from base stations 201 and 301 using transmitters 281, 381 under the supervision of the control station 101, an example of such control being described in U.S. Pat. No. 4,772,887 issued Sep. 20, 1988 to Dunkerton et al., entitled "Individual Simulcast Station Control Decoder" which is assigned to the assignee of the present invention, and which is incorporated by reference herein. When the voice messages and numeric and alphanumeric information are received by the base station 201, 301, the information is processed for simulcast transmission, an example of using such processing is described in U.S. Pat. No. 4,701,758 issued Oct. 20, 1987 to Dunkerton et al., entitled "Individual Simulcast Transmitter Remote Control System Encoder" which is also assigned to the assignee of the present invention, and which is further incorporated by reference herein. The control schemes described above are for example only, and it will be appreciated that other control schemes are suitable for use as well with equal effectiveness.

During delay equalization measurement intervals, transmitters 281, 381 communicate over distribution links 283, 383 to receiving means 491. The distribution links 283, 383 are the RF communication links used for normal simulcast transmissions. The output of receiver means 491 is coupled to a monitor receiver station 401 which processes the information received from the base stations 201, 301 for transmission back to the control station 101. The processed information is coupled to a transmission means 481 for transmission over transmission link 483 to receiving means 191, which then couples the received information to the control station 101. Transmission means 481, communication link 483 and receiving means 191 can be implemented using any of the distribution techniques described for distribution links 293, 393 above.

During the delay equalization measurement process, the control station 101 begins the delay equalization process by sending a key analog (KA) message to a selected base station which will be used as a reference station for referencing all delay equalization measurements, such as base station 201. An example of the selection of such a base station for delay equalization purposes is shown and described in U.S. Pat. No. 5,014,344 issued May 7, 1991 to Goldberg, entitled "Method for Synchronizing the Transmissions in a Simulcast Transmission System" which is assigned to the assignee of the present invention, and which is incorporated by reference herein. The KA message is followed by an automatic delay equalization (ADEQ) timing pattern, or delay equalization measurement signal, such as will be described below. The control station 101 measures the exact time delay from the generation of the timing pattern and transmission over distribution link 293 to the detection of the timing pattern in the return path represented by distribution link 483. The time delay represents a round trip path delay. A dekey message is then sent to base station 201, followed by a KA message to the next selected base station, such as base station 301. The round trip path delay is then measured as described above for base station 201. The difference in the measurement for base station 201 and the measurement for base station 301 is the difference in the control path delay plus the differences in the air mile delay from each base station 201, 301 to the monitor receiver station 401 over distribution links 283, 383, respectively. Based on the delay equalization measurement differences and air mile data for each base station and monitor receiver station pair which is entered by the system operator, a correction factor can be determined to enable equalizing base station 301 to have an equal inbound path delay as base station 201. It will be appreciated when the simulcast transmission system covers a large geographic area, multiple monitor receiver sites may be required to enable complete system equalization, an example of which is described in U.S. Pat. No. 5,014,344 to Goldberg. Likewise, where the system is relatively small, equalization may be accomplished without the need for more than one monitor receiver station. Such a system will be described in detail below.

Figure 2:
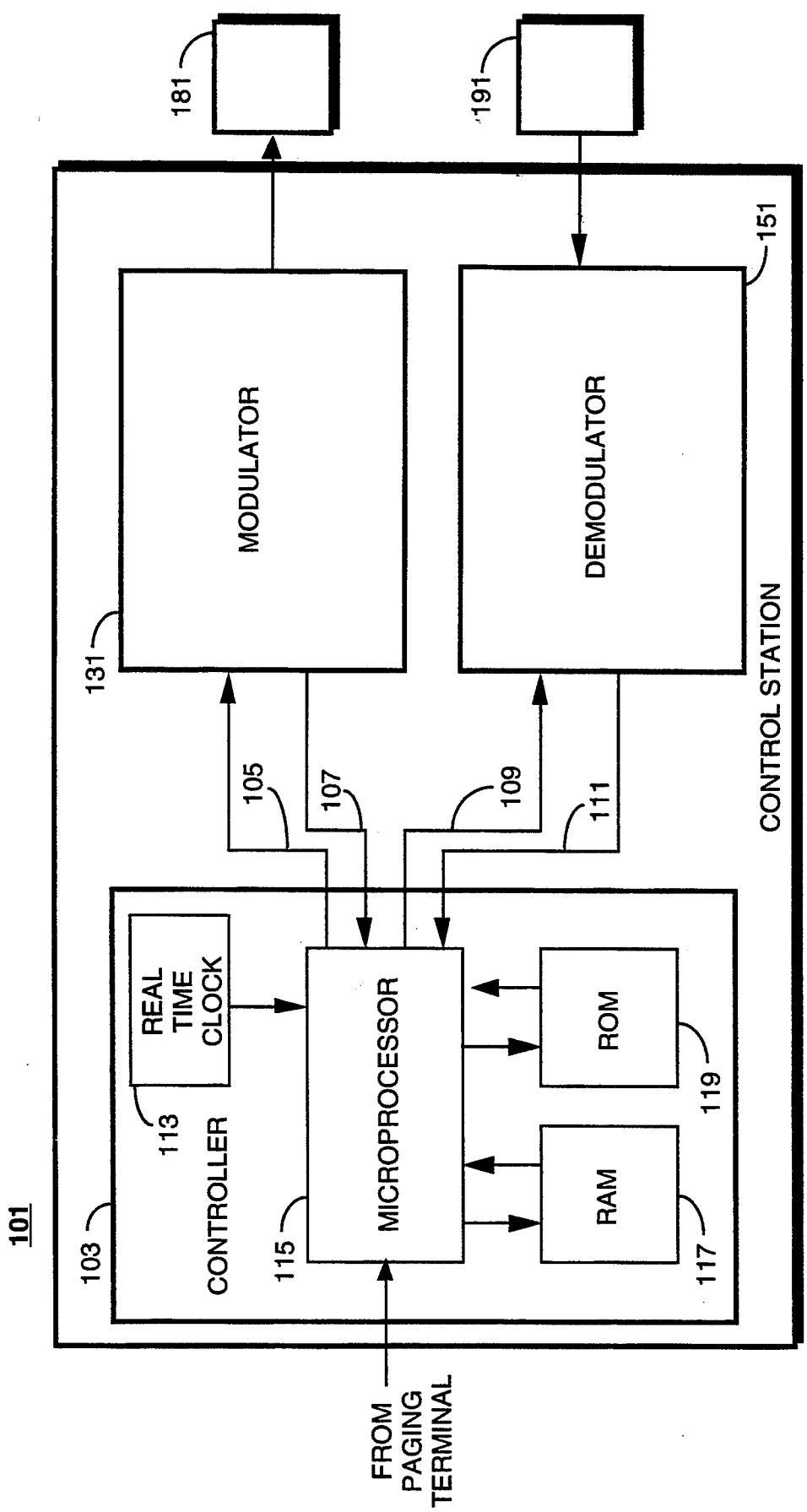
FIG. 2 is an electrical block diagram of the control station using adaptive demodulation for transmission path delay measurements in accordance with the preferred embodiment of the present invention.

FIG. 2 is an electrical block diagram of the control station 101 using adaptive demodulation for transmission path delay measurements in accordance with the preferred embodiment of the present invention. The heart of the control station 101 is the controller 103 described above, which is preferably implemented using a microprocessor such as an MC6800 or MC68000 Series microprocessor (uP) manufactured by Motorola, Inc. Coupled to the microprocessor is a random access memory (RAM) 117 which, among other things, is used to temporarily store controller data and information received from the paging terminal prior to distribution and transmission throughout the simulcast transmission system. The random access memory is implemented using conventional semiconductor random access memory such as to provide a volatile memory storage area, or an electrically erasable programmable read only memory (EEPROM or FLASH) or a hard disk drive, both of which provide a non-volatile random access memory, or any combination thereof. A read only memory (ROM) 119 also couples to the microcomputer and stores routines which will be described in detail below, and which are used in controlling the operation of the control station 103. The read only memory 119 includes either an Ultra Violet Erasable Programmable Read Only Memory (UVEPROM) or a one time Programmable Read Only Memory (PROM), and optionally is implemented utilizing a non-volatile random access memory, such as an electrically erasable programmable read only memory (EEPROM or FLASH) or a hard disk drive, or any combination thereof. Also coupled to the microprocessor 115 is a real time clock which is used to control the timing of the control station 101 for such functions as message distribution, information data logging, and in the measurement of the path delays during delay equalization measurements. It will be appreciated that the controller 103 can also be implemented using other control devices, such as the DSP56000 Series digital signal processor (DSP) manufactured by Motorola, or microcontrollers (uC), such as the 6811 and 68302 series microcontrollers also manufactured by Motorola.

The microprocessor 115 controls the generation of transmitter control information used to control the operation of the base stations for simulcast transmission and for delay equalization measurements. The microprocessor 115 also controls the recovery of digitized voice messages and numeric or alphanumeric messages from the random access memory 117. The modulator 131 is comprised of hardware modem circuitry or alternately a uP/uC/DSP processor with the appropriate analog reconstruction circuitry controlled by the microprocessor 115. The reconstruction circuitry would be comprised of a digital to analog (D/A) converter, a low pass filter and audio drivers. Message and control information received over the data and control input 105 is modulated by the modulator 131 into a number of modulation formats, such as MDC1200 modulation format for transmitter control information, analog voice for digitized voice information, paging FSK (frequency-shift keyed) data for numeric or alphanumeric messages, and Bell 202T audio FSK for delay equalization measurement information. The modulated output level is monitored through the status output 107 by the microprocessor 115 in order to insure modulation leveling when each of the different modulation formats is utilized. The use of MDC1200 modulation, analog voice conversion and paging FSK data modulation are well known to one of ordinary skill in the art. The use of Bell 202T audio FSK modulation will be described in detail below. The information modulated by the modulator 131 is applied to the input of the transmission means 181, as was described above.

Modulated information received by the receiver means 191 is applied to the input of demodulator 151. The demodulator 151 is comprised of hardware modem circuitry or alternately a uP/uC/DSP processor with the appropriate analog sampling circuitry controlled by the microprocessor 115 via control input 109. The sampling circuitry would be comprised of an analog to digital (A/D) converter, a low pass filter and audio buffers. The demodulated information is coupled through the data output 111 to the microprocessor 115, which processes the demodulated information, such as the delay equalization measurement information, as will be described in detail below.

Figure 3:
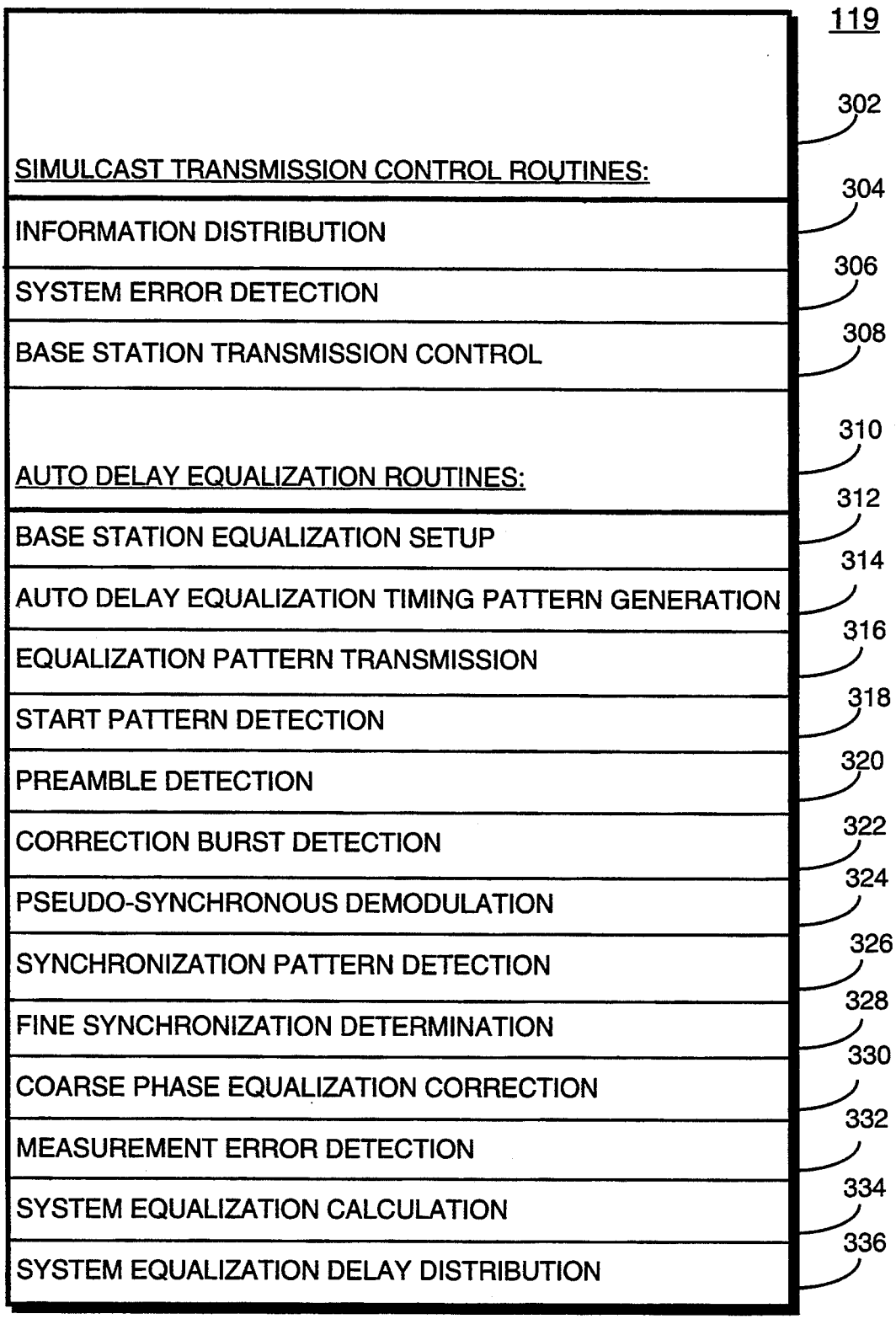
FIG. 3 is a memory map depicting routines used in controlling simulcast message transmission and adaptive demodulation for transmission path delay measurements in accordance with the preferred embodiment of the present invention.

FIG. 3 is a memory map of ROM 119 depicting routines used in controlling simulcast message transmission and adaptive demodulation for transmission path delay measurements in accordance with the preferred embodiment of the present invention. ROM 119, as shown, contains various simulcast transmission control routines 302, including, but not limited to, information distribution routines 304 which control the distribution of message information throughout the simulcast transmission system; system error detection routines 306, which service error messages received from the base stations; and base station control routines 308 which control, among other things, transmitter keying and dekeying for the transmission of message information. The ROM 119 also includes various auto delay equalization routines 310, including, but not limited to, a base station equalization setup routine 312, which controls base station selection for equalization measurements; an auto delay equalization timing pattern generation routine 314, which controls the generation of the delay equalization measurement pattern; an equalization pattern transmission routine 316, which controls the start of the equalization pattern transmission; a start pattern detection routine 318, which controls the received start pattern detection; a preamble detection 320 which controls preamble detection to allow receiver settling; a correction burst pattern detection routine 322 which controls detection of correction pattern edges, and storage of corresponding time information; a pseudo-synchronous demodulation routine 324 which controls pseudo-synchronous sampling of the received information to enable improved demodulation reliability; a synchronization pattern detection routine 326, which controls correlation of the received information for synchronization pattern detection and a coarse delay time measurement; a fine synchronization determination routine 328, which controls processing of the correction pattern timing information to generate an accurate fine delay time measurement adjustment; a coarse phase equalization correction routine 330, which enables computation of the coarse delay time measurement with the fine delay time measurement adjustment; a measurement error detection routine 332, which enables error detection during delay equalization measurements and enables repeating errored measurements; a system equalization calculation routine 334, which normalizes the measured path delays for all base stations within the system; and a system equalization delay distribution routine 336, which enables distribution of the delay equalization correction factors to all base stations within the simulcast system.

Figure 4:
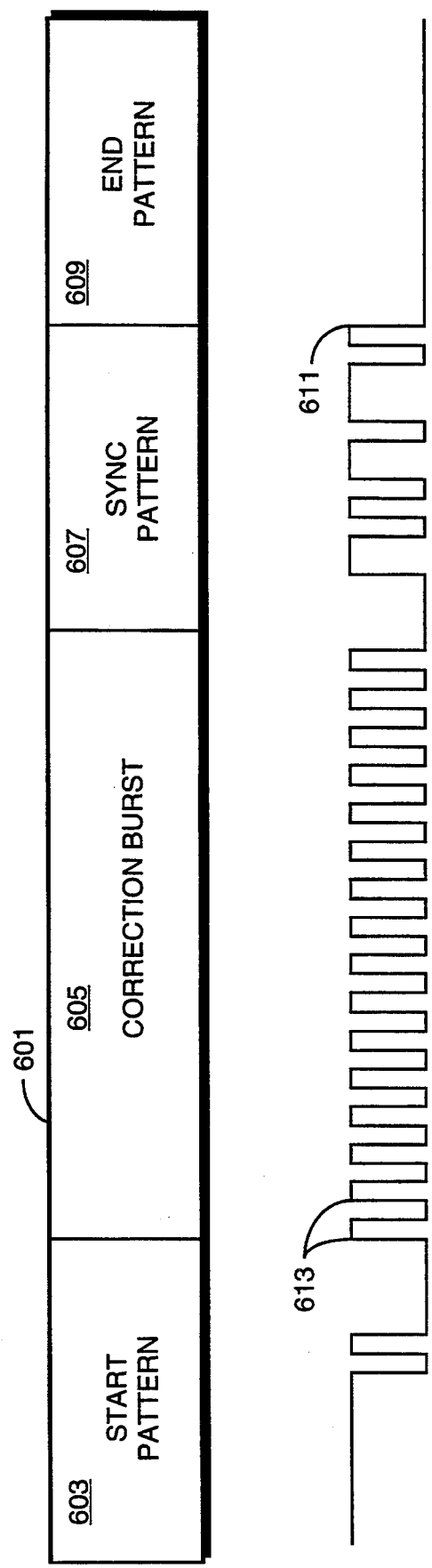
FIG. 4 is a timing diagram depicting the delay equalization measurement signal enabling adaptive demodulation for transmission path delay measurements in accordance with the preferred embodiment of the present invention.

FIG. 4 is a timing diagram depicting the delay equalization measurement signal enabling adaptive demodulation for transmission path delay measurements in accordance with the preferred embodiment of the present invention. The delay equalization measurement signal, or pattern, is composed of an optional start pattern 603, or preamble, which is two eight-bit bytes in length (40 mSec duration), a correction burst 605 which is forty bytes long (800 mSec duration), a synchronization, or sync, pattern 607 which is two bytes in length (40 mSec duration) and an optional end pattern 609 which is two bytes in length (40 mSec duration). The delay equalization measurement pattern is a 400 baud, Bell 202T, audio FSK bit pattern. The above mentioned pattern lengths and baud rates are provided as an example only, and any appropriate pattern lengths and rates may be utilized based upon expected communications channel conditions. The Bell 202T tones are 1200 Hertz (Hz) and 2200 Hz±0.2%. The 1200 Hz tone corresponds to a TTL 0 and the 2200 Hz tone corresponds to a TTL 1. The adaptive demodulation performed by the demodulator utilizes an FSK demodulation technique known as auto correlation or differential detection, and provides a means for adapting the demodulation to the transmission channel's group delay distortions. The FSK demodulation technique is adaptive because the time of each tone pair transition reflects, or conforms, to the transmission channel's group delay characteristics. These channel group delay characteristics affect the paging data in exactly the same manner since the same tone pairs (1200/2200) are used to send paging data to the transmitters. The ability to tolerate large group delay distortion is improved in the preferred embodiment of the present invention through the use of the low baud rate delay equalization measurement signal utilized, which is 400 baud. Other baud rates and tone pairs can be used as required by the channel characteristics.

The optional start pattern 603, or preamble, is a pure 1200 Hz tone transmitted for 40 mSec, or equivalently, represents a two byte (sixteen bit) zero pattern, and provides time for the demodulator at the control station to settle at the start of the measurement period. The correction burst comprises an alternating one/zero pattern. The time of each edge 613 (rising, falling or both) is captured to enable pseudo-synchronous demodulation and fine delay time correction, as will be described in detail below. The synchronization pattern is a bit pattern to indicate a coarse reception time. In the preferred embodiment of the present invention, the synchronization pattern is the two byte hexidecimal number $1ADD which was statistically selected to prevent false detection. The final edge 611 is used to define the coarse round trip measurement time. The end pattern 609 is a pure 1200 Hz tone transmitted for 40 mSec, or equivalently, represents a two byte (sixteen bit) zero pattern, and statistically minimizes false sync pattern detection.

Figure 5:
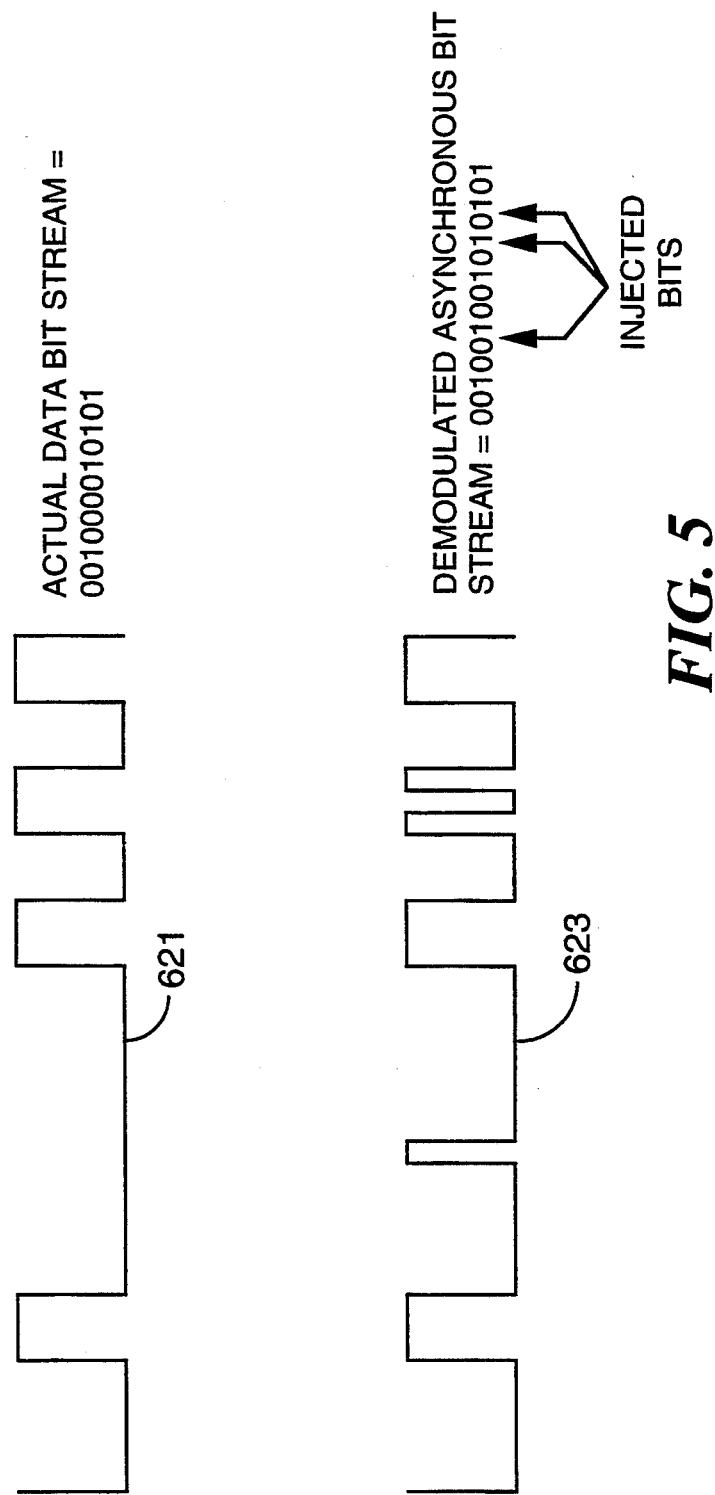
FIG. 5 is a timing diagram depicting transmission errors encountered during adaptive demodulation for transmission path delay measurements in accordance with the preferred embodiment of the present invention.

FIG. 5 is a timing diagram depicting transmission errors encountered during adaptive demodulation for transmission path delay measurements in accordance with the preferred embodiment of the present invention. As shown in FIG. 5, the error free bit pattern transmitted comprises a data bit stream equivalent to 001000010101. During the transmission, two additional bits caused by random noise are injected into the bit stream resulting in a data bit stream equivalent to 001001001010101. Pseudo-synchronous demodulation to be described in detail below is used to minimize demodulation errors caused by such transmission generated errors.

Figure 6:
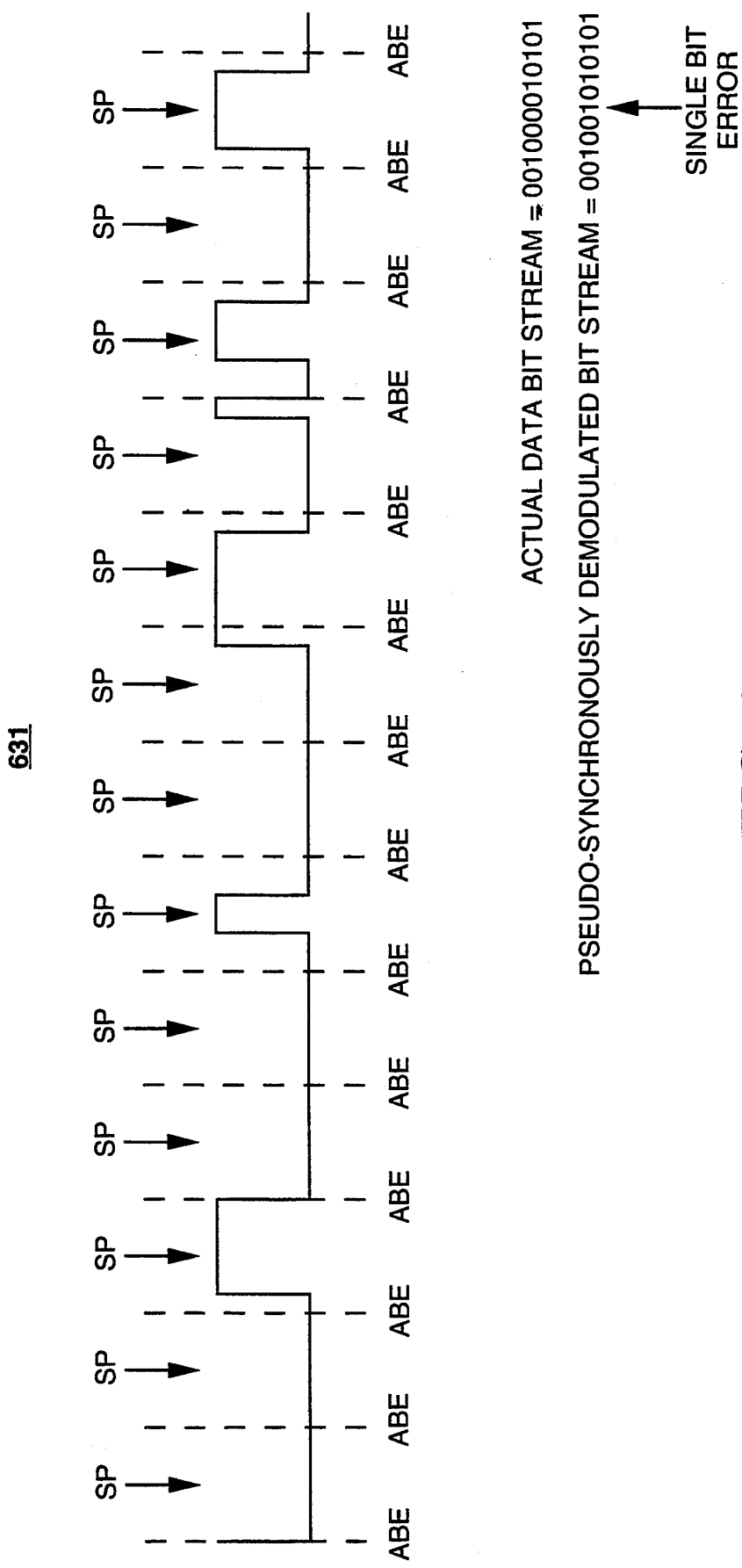
FIG. 6 is a timing diagram depicting pseudo-synchronous demodulation for transmission path delay measurements in accordance with the preferred embodiment of the present invention.

FIG. 6 is a timing diagram depicting pseudo-synchronous demodulation for transmission path delay measurements in accordance with the preferred embodiment of the present invention. During the reception of the correction signal, the edge times are captured. Once sixty-four edges have been captured, pseudo-synchronous demodulation will begin. Pseudo-synchronous demodulation is accomplished by calculating the average bit edge (depicted in FIG. 6 as ABE) from the average edge time using the most recent sixty-four edges. Each new edge detected results in a new average bit edge value. In this way, the demodulator is locked to the baud rate of the incoming signal. By using the calculated ABE, a sample point (depicted in FIG. 6 as SP) can be set up as the bit center to derive the correct data polarity from the asynchronous wave form received, and a data bit can be extracted. As shown in FIG. 6, while two injected bit edges were present in the as received bit stream, the correct number of bits were extracted using pseudo-synchronous demodulation even though there was one bit error. In a manner well known to one of ordinary skill in the art, bit errors may be corrected, while injected or added bits, as described above, are difficult to detect and correct. Pseudo-synchronous demodulation is used to demodulate the correct number of bits for comparison to the expected synchronization pattern.

Figure 7:
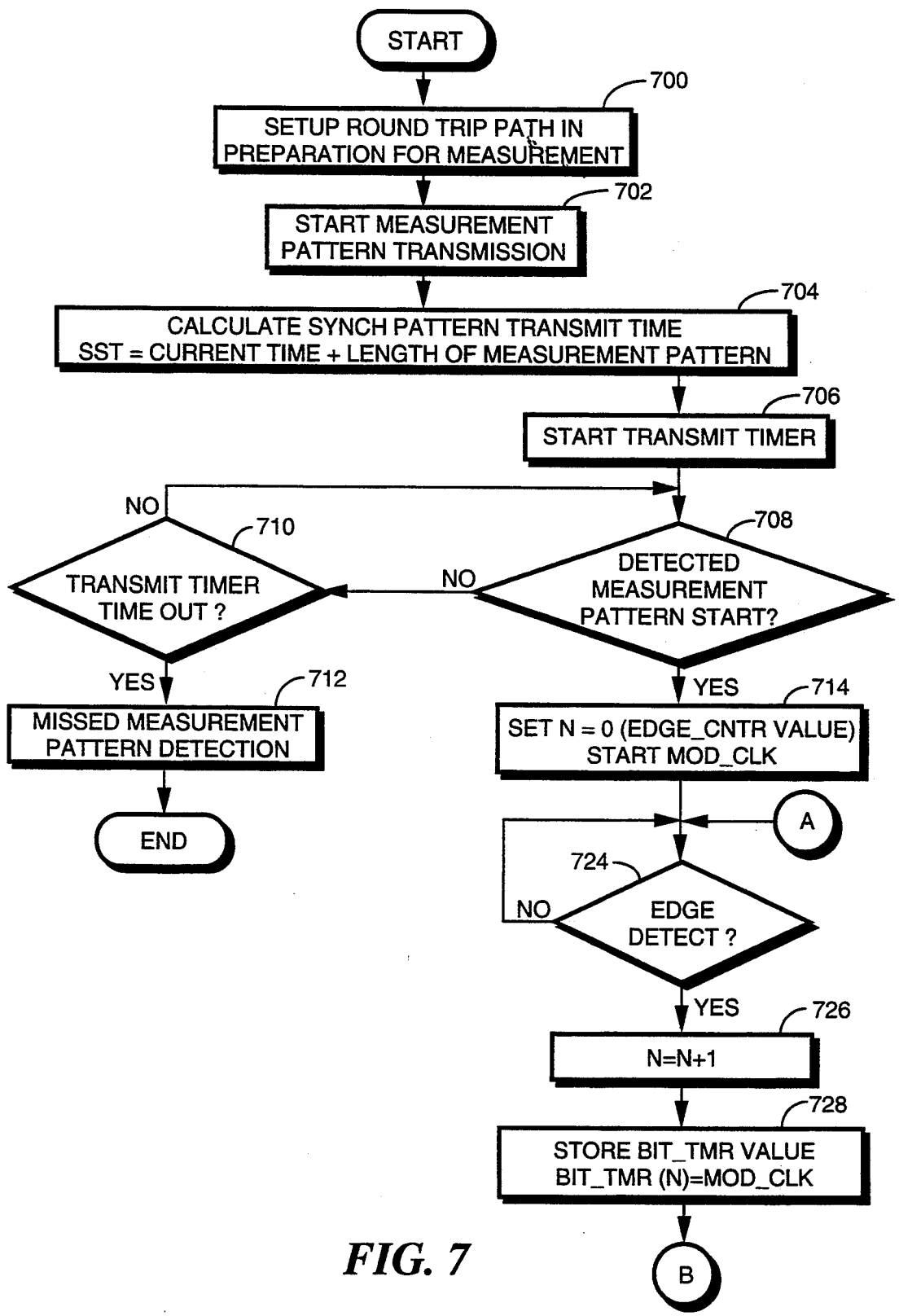
FIG. 7 is a flow chart depicting preamble detection and correction pattern capture during adaptive demodulation for transmission path delay measurements in accordance with the preferred embodiment of the present invention.

FIG. 7 is a flow chart depicting preamble detection and correction pattern capture during adaptive demodulation for transmission path delay measurements in accordance with the preferred embodiment of the present invention. When the automatic delay equalization measurement sequence is started, the control station selects a base station and sets up the round trip path 700 to be utilized in preparation for the measurement. The round trip path setup 700 includes transmitting a control sequence to all base stations and receiver monitor stations indicating that the automatic delay equalization measurement sequence is to be performed. The control sequence also indicates the selected base station which is presently to be measured, and which receiver monitor station is to receive and forward the delay equalization (ADEQ) measurement pattern, or signal. The control station next initiates the delay equalization measurement pattern transmission 702, storing the current time of transmission indicated by the real time clock, and simultaneously enables the ADEQ measurement signal receiver and processing functions within the control station. The actual time of ADEQ measurement signal transmission is defined by the transmission time of the last bit of the synchronization pattern. The synchronization pattern start time (SST) is then calculated 704 as equal to the current time of transmission plus the length of the ADEQ measurement signal which is precisely known. A transmit timer is started 706 at the SST time. The transmit timer is preferably set to a time sufficient to insure completion of the ADEQ measurement pattern sequence for the worst case base station, and by way of example, is ten seconds per selected base station measurement, although it will be appreciated that other time intervals can be utilized as well. When a start pattern is detected in the ADEQ measurement signal received 708 at the control station, ADEQ measurement signal processing is initiated. During the time when the start pattern is not detected, the transmit timer is monitored 710 to insure time out has not occurred, at which time, the process flow returns to monitoring the received signal for the start pattern 708. Should the transmit timer time out 710, an indication 712 is provided that the ADEQ measurement signal was not received and detected at step 708, and the automatic delay equalization measurement sequence for the selected base station is terminated. The automatic delay equalization measurement sequence for the selected base station can be then immediately repeated, or repeated after measurements for all other base stations to be measured are made.

Continuing with FIG. 7, when the start pattern is detected 708, the automatic delay equalization measurement sequence continues to step 714. It will be appreciated that when a start pattern is not utilized in the ADEQ measurement signal, the automatic delay equalization measurement sequence automatically continues to step 714. An edge counter (N) within the controller is initialized, and the modulo clock (MOD_CLK) is started 714. When an edge is detected 724, the edge counter value (N) is incremented 726, and the modulo clock value at the time of the edge detection is stored and identified by the corresponding edge counter value (BIT_TMR(N)) 728. Whether or not a data edge is detected, process flow continues to FIG. 8.

In summary, processing of the automatic delay equalization measurement sequence is initiated by either detection of the start pattern, or detection of a first edge which occurs following the preamble sequence. The start pattern or preamble sequence allows sufficient time for the demodulator circuitry within the control station to settle, thereby ensuring ADEQ measurement signals are being received and detected properly. Should the transmit timer time out during the start pattern or preamble sequence, the measurement sequence for the selected base station is terminated, and can be repeated immediately or following measurements of other base stations within the base station measurement sequence.

It will be appreciated that any number of means of capturing and storing bit edge arrival times may be used with equal effectiveness. For example, each bit edge may be time stamped using a free running or a modulo baud clock. Alternately, a bit interval timer could be used to measure the time between edges. In the preferred embodiment of the invention, a modulo clock is used to provide maximum computational efficiency. A modulo clock can be best understood described by imagining the second hand on a standard clock. Every sixty seconds, the second hand overflows, or modulo wraps, and begins counting again from zero. The second hand is a modulo 60 second counter. Imagine also a square wave data pattern with a baud rate of 60 seconds. Every 60 seconds, a rising or falling edge occurs in the data pattern. If each edge is time stamped using the modulo 60 seconds counter, each edge will occur at the same time on the modulo clock. For example, if the first data edge occurs at 15 seconds on the clock, each subsequent data edge will also occur at 15 seconds. When jitter is added to this hypothetical data pattern by line impairments, each edge will deviate slightly from the ideal arrival time of 15 seconds. By taking an average of many edge times, an average arrival time of 15 seconds can be calculated. This is the basis for the present invention except that a modulo clock overflows at the signal baud rate, which by way of example is 400 baud.

Figure 8:
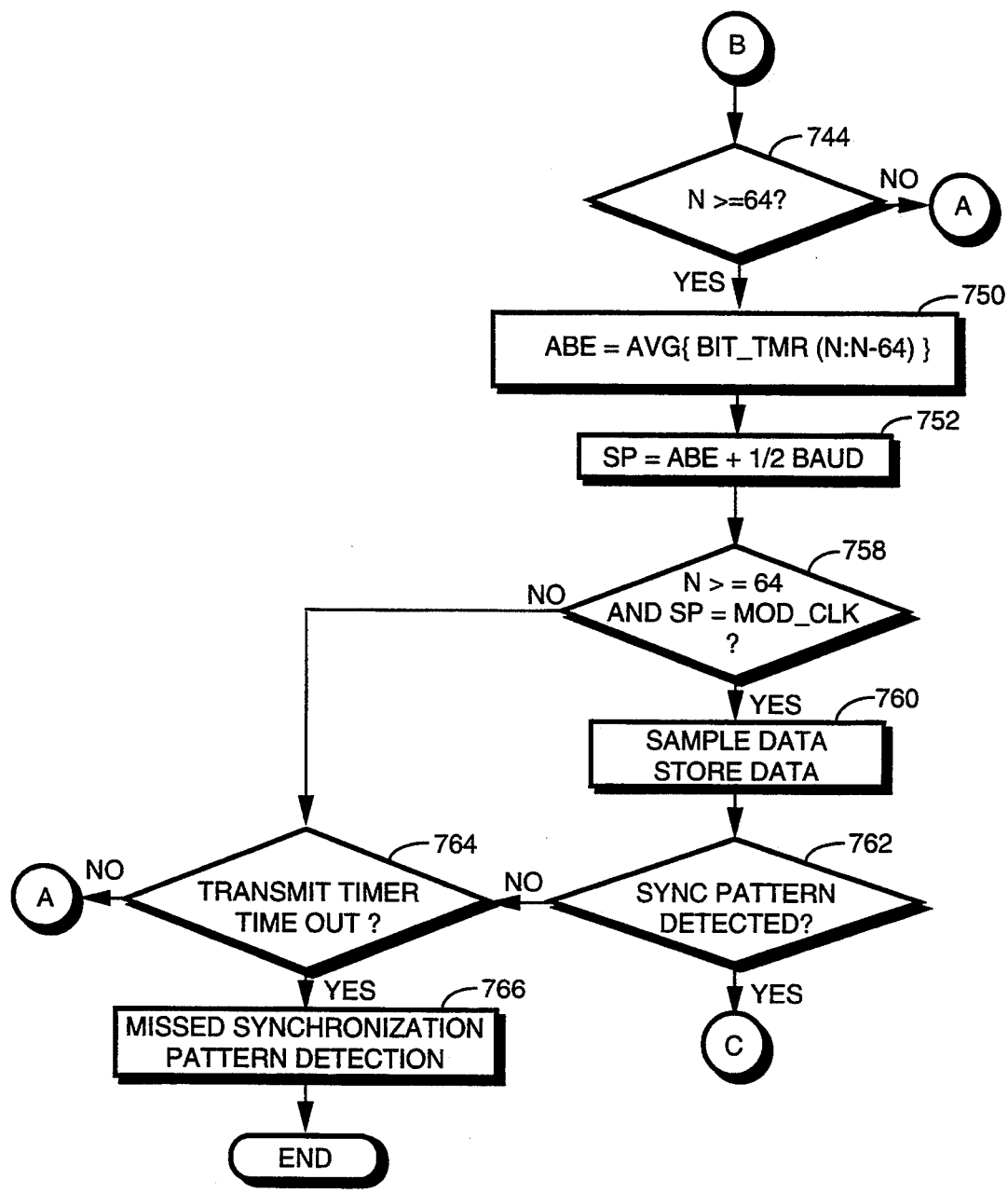
FIG. 8 is a flow chart depicting pseudo-synchronous demodulation for transmission path delay measurements in accordance with the preferred embodiment of the present invention.

FIG. 8 is a flow chart depicting pseudo-synchronous demodulation for transmission path delay measurements in accordance with the preferred embodiment of the present invention. In FIG. 8, once sixty-four bit edges have been detected 744 an average bit edge (ABE) can be calculated 750 as the modulo average of the most recent 64 edges. Until 64 edges are captured 744 process flow returns to FIG. 7. It will be appreciated that fewer or greater bit edge detections can be monitored to establish the ABE value, and that the accuracy of the ABE value is a function of the number of bit edges detected. Once the ABE is calculated, the bit sample point (SP) is calculated as the ABE plus one-half the baud rate 752.

Continuing in FIG. 8, and until the modulo clock equals the SP value, the transmit timer is monitored for time-out 764. When the modulo clock value is compared to the SP value 758, and when the modulo clock equals the SP value, the received data is sampled and then store 760. A subset of the stored data values are then compared with the synchronization pattern, in a manner well known by one of ordinary skill in the art, to determine whether the sync pattern has been detected 762. When the sync pattern is detected 762, program flow moves to step 774 in FIG. 9. When the sync pattern is not detected 762, the transmit timer is checked 764 to determine whether the transmit timer has timed out. Should the transmit timer time out 764, an indication 766 is provided that the sync portion of the ADEQ measurement signal synchronization pattern was not received and detected within the transmit time-out time and the automatic delay equalization measurement sequence for the selected base station is terminated. The automatic delay equalization measurement sequence for the selected base station can be then immediately repeated, or repeated after measurements for all other base stations to be measured are made. When the transmit timer has not timed out 764, process flow returns to FIG. 7.

In summary, pseudo-synchronous demodulation is accomplished by calculating a rolling average bit edge (ABE) value from the edge times measured by the modulo clock using the most recent sixty-four edges. Each new edge results in a new average bit edge value. In this way the demodulator is locked to the baud rate of the incoming signal, and by using the calculated ABE, a sample point (SP) is set up at the bit center to derive the correct data polarity from the asynchronous waveform, and a data bit can be extracted.

Figure 9:
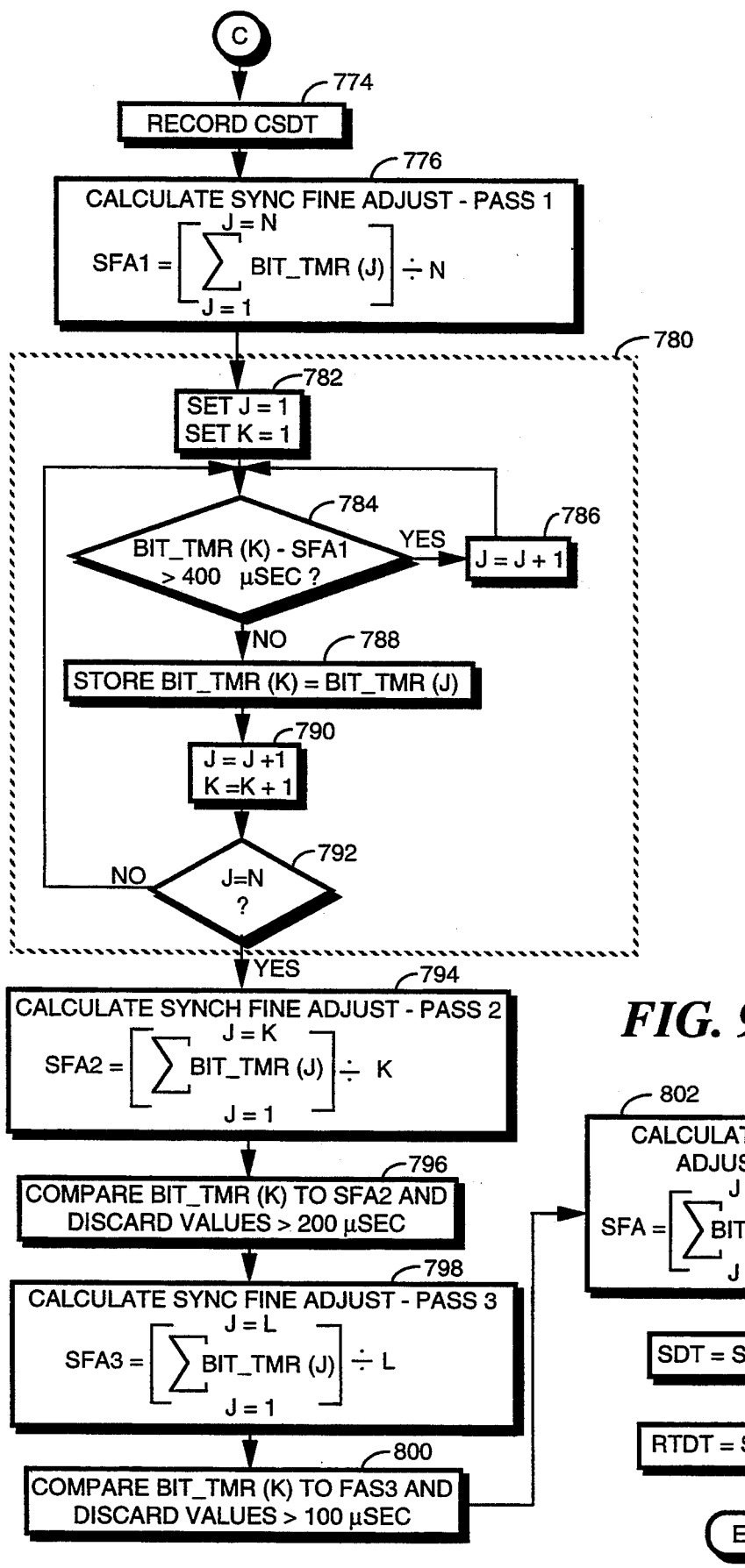
FIG. 9 is a flow chart depicting fine timing correction of the transmission path delay measurements in accordance with the preferred embodiment of the present invention.

FIG. 9 is a flow chart depicting fine time correction of the transmission path delay measurements in accordance with the preferred embodiment of the present invention. When the synchronization pattern is detected 762, the coarse synchronization detect time (CSDT) value is set equal to the real time of detection of the last bit of the synchronization pattern 774. A first pass fine sync adjustment calculation is then performed 776, by computing the modulo average of all N stored edge times to obtain a first sync fine adjust value (SFA1). Consequently, it will be appreciated that the accuracy of the first sync fine adjust value (SFA1) can be controlled by the number of bits transmitted within the correction pattern portion of the ADEQ measurement signal. The first sync fine adjust value (SFA1) is used to eliminate errant bit edge detections such as generated by injected bits. An errant bit elimination routine 780 is next performed. Sorting parameters (J and K) are set to one 782, and the SFA1 value is subtracted from the first stored bit time value (BIT_TMR(1)) and compared to a first predetermined difference value, which in the preferred embodiment of the preferred invention is 400 microseconds ($\mu$Sec) 784. When the difference between the stored bit time value and the first sync fine adjust value (SFA1) exceeds 400 $\mu$Sec 784, the bit count index (J) is incremented 786, and the next bit count value is processed 784. When the difference between the stored bit time value and the first sync fine adjust value is not greater than 400 $\mu$Sec 784, the bit timer (STR_BIT_TMR) value is stored 788. The bit count index (J), and a bit time index (K) are then incremented by one 790, and the bit count index (J) is compared to the correction pattern edge count at step 792. When the bit count index (J) is less than N at step 792, steps 784 through 792 are repeated until all bit time values are processed, and errant bit times are eliminated.

A second sync fine adjust value (SFA2) is then calculated 794 using the stored bit time values remaining from the first elimination process (STORE_BIT_TMR). The second sync fine adjust value (SFA2) is then subtracted from each of the original N stored bit times (BIT_TMR), and the differences are compared to a second predetermined difference value, which in the preferred embodiment of the present invention is 200 μSec. All bit time values having differences greater than 200 μSec are then eliminated, and the remaining values are stored in STORE_BIT_TMR 796, as described above.

A third sync fine adjust value (SFA3) is then calculated 798 using the stored bit time values remaining from the second elimination process (STORE_BIT_TMR). The third sync fine adjust value (SFA3) is then subtracted from each of the original N stored bit times (BIT_TMR), and the differences are compared to a third predetermined difference value, which in the preferred embodiment of the present invention is 100 μSec. All bit time values having differences greater than 100 μSec are then eliminated, and the remaining values are stored in STORE_BIT_TMR 800, as described above.

A final sync fine adjust value (SFA) is then calculated 802 using the stored bit time values remaining from the third elimination process (STORE_BIT_TMR). The final sync fine adjust value (SFA) computed enables a sync detect time value (SDT) to be calculated 804 as the coarse sync detect time (CSDT) minus the sync final adjust value (SFA). The sync detect time value (SDT) calculated corresponds to locating the last bit of the sync pattern with accuracy up to an order of magnitude better than derived from the time established by the coarse sync detect time. The round trip delay time value (RTDT) is finally calculated 806 as the sync detect time value (SDT) minus the sync start time value (SST) calculated at the beginning of the measurement process at step 704 of FIG. 7.

While time values of 400 μSec, 200 μSec and 100 μsec are utilized as criteria for determining the final sync fine adjust value, it will be appreciated that other values and more or less averages can be utilized as well depending upon the characteristics of the transmission path being measured.

In summary, once the sync pattern has been detected, the coarse delay time value is corrected using the bit times from all stored edges of the correction burst. An initial average is calculated of all the captured edge times. A second average is calculated of all values with 400 microseconds of the first average. A third average is then calculated of all values within 200 microseconds of the second average. A final average is then calculated from all values within 100 microseconds of the third average. This value is used to fine adjust the coarse delay time measured. In the preferred embodiment of the present invention, at least one hundred (100) edge time values must remain for calculating the final edge time value. If at least 100 edge time values remain, the fine correction value is considered valid, and is used to correct the measured coarse delay time value. Once the measured coarse delay time value is corrected, the round trip delay for the base station is established. By knowing the round trip delay time value, and air time values corresponding to the distances between the control station and the base stations, the base stations and the monitor receiver station(s), and the monitor receiver station(s) and the control station (when an RF link is used) the variable path and equipment delays for the selected base stations within the simulcast transmission system are determined. Final adjustment of the equalization delays throughout the system are then accomplished by sending the equalization delay correction factor to each of the base stations.

Figure 10:
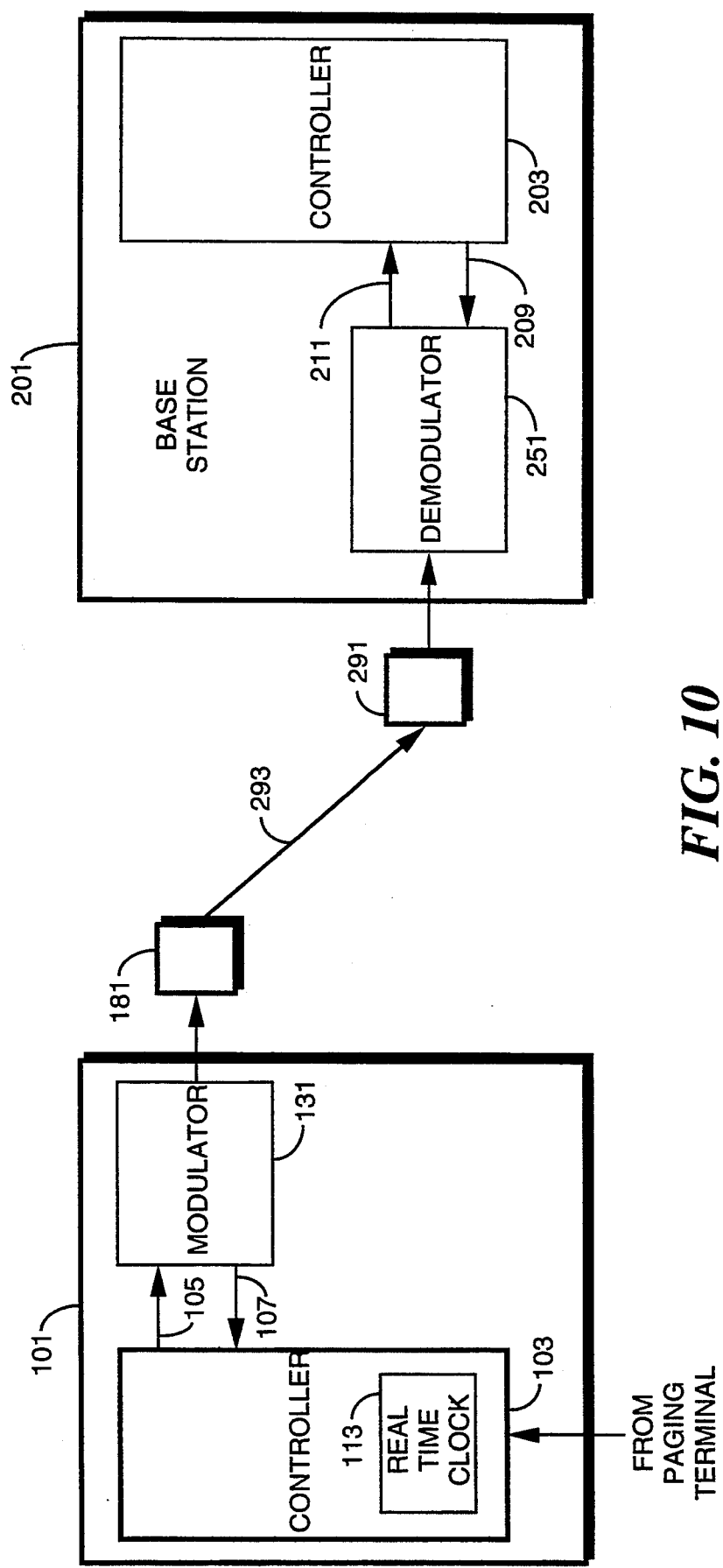
FIG. 10 is an electrical block diagram of an alternate embodiment of a simulcast transmission system using adaptive demodulation for transmission path delay measurements in accordance with the preferred embodiment of the present invention.

FIG. 10 is an electrical block diagram of an alternate embodiment of a simulcast transmission system using adaptive demodulation for determination of path delay change measurements in accordance with an preferred embodiment of the present invention. As shown in FIG. 10, the simulcast transmission system comprises a control station 101 and a transmission station 201. It will be appreciated that while only one transmission station is shown, a typical simulcast transmission system will include two or more transmission stations. The control station 101 comprises a controller 103 for controlling the distribution of information, as described above for the simulcast transmission system of FIG. 1. The controller 103 receives information for transmission from such information inputting devices as a paging terminal (not shown), in a manner well known to one of ordinary skill in the art, and couples the information to be transmitted to a modulator 131 through data input 105, and also receives operational status information, such as leveling information, from status output 107. The modulator 131 modulates the information in an appropriate modulation format for transmission. The information modulated by modulator 131 is coupled to transmission means 181 which transmits the modulated information over a communication link 293 to receiving means 291, the output of which then couples to a modulation input of a base station 201. Transmission means 181, communication link 293 and receiving means 291 provide an information distribution network also as described above for the simulcast transmission system of FIG. 1. The information received by receiving means 291 is coupled to the input of the demodulator 251 which processes the information as described above, providing the processed information to the controller 203.

During the delay measurement process, the control station 101 begins the delay measurement process by sending the delay measurement signal, which is similar to that described above, to a selected base station such as base station 201 at regular predetermined intervals. Alternatively, the time of transmission may be imbedded within the measurement signal, or sent before or after transmission of the measurement signal. Furthermore, the delay measurement signal may be sent to all base stations simultaneously. Each base station compares the reception time to the expected reception time in order to determine if a delay change in the control path occurred, as will be described below.

Figure 11:
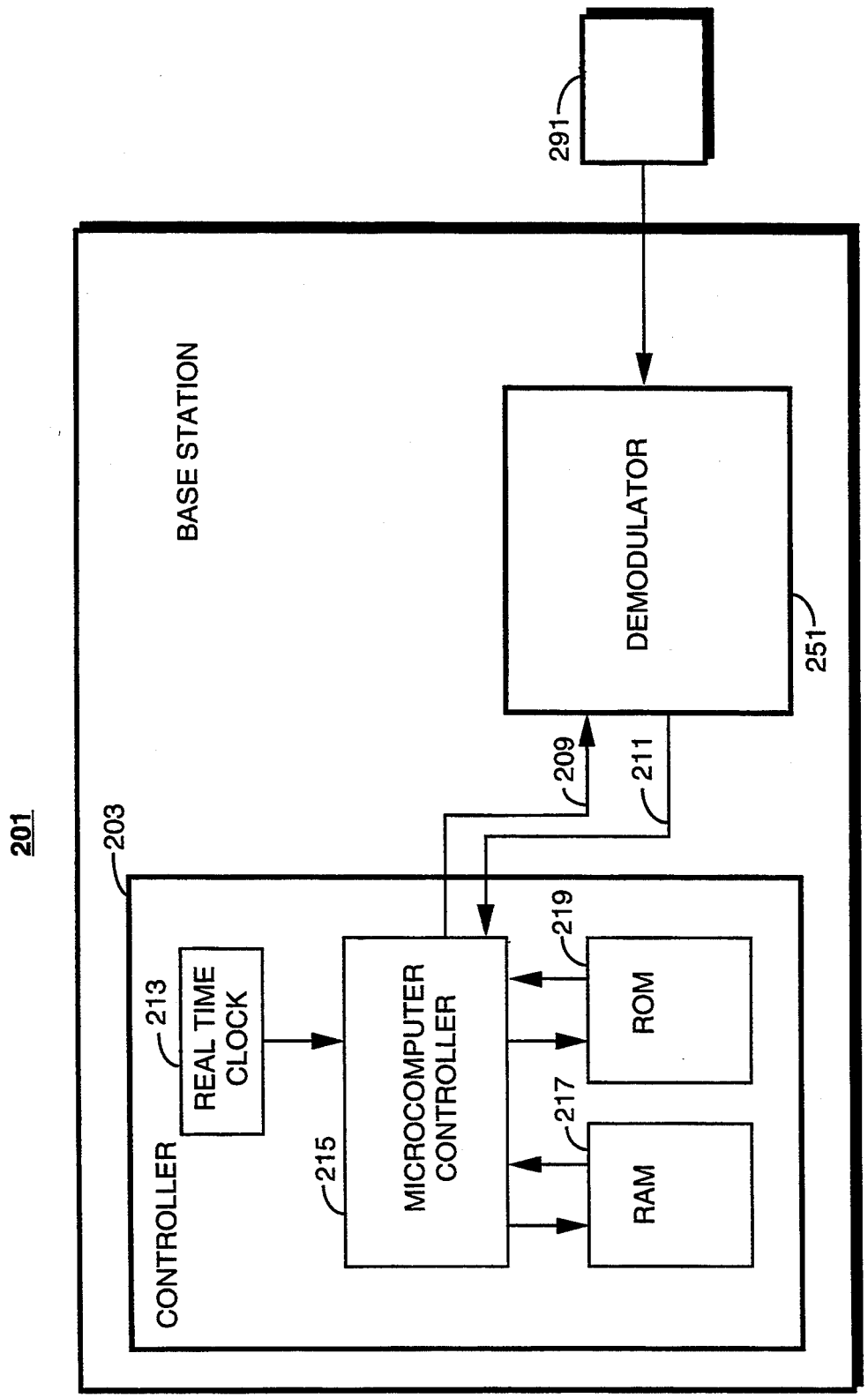
FIG. 11 is an electrical block diagram of the control station using adaptive demodulation for transmission path delay measurements in accordance with the alternate embodiment of the present invention.

FIG. 11 is an electrical block diagram of the base station 201 using adaptive demodulation for transmission path delay measurements in accordance with the alternate embodiment of the present invention. The heart of the base station 201 is the controller 203 described above, which is preferably implemented using a microprocessor such as an MC6800 or MC68000 series microprocessor (uP) manufactured by Motorola Inc. Coupled to the microprocessor is a random access memory (RAM) 217 which is used to temporarily store controller data. The random access memory 217 is implemented using conventional semiconductor random access memory such as to provide a volatile memory storage area, or an electrically erasable programmable read only memory (EEPROM or FLASH) or a hard disk drive, both of which provide a non-volatile random access memory, or any combination thereof. A read only memory (ROM) 219 also couples to the microprocessor and stores routines similar to those described above, and which are used in controlling the operation of the base station 203. The read only memory 219 includes either an Ultra Violet Erasable Programmable read Only Memory (UVEPROM) or a one time Programmable Read Only Memory (PROM), and optionally is implemented utilizing a non-volatile random access memory, such as an electrically erasable programmable read only memory (EEPROM or FLASH) or a hard disk drive, or any combination thereof. Also coupled to the microprocessor 215 is a real time clock 213 which is used to control the timing of the base station for the measurement of the path delay change during delay measurements. It will be appreciated that the controller 203 can also be implemented using other control devices, such as the DSP56000 series digital signal processor (DSP) manufactured by Motorola, or micro controllers (uC), such as 6811 and 68302 series microcontrollers manufactured by Motorola.

Modulated information received by the receiver means 291 is applied to the input of demodulator 251. The demodulator is comprised of hardware modem circuitry or alternately a uP/uC/DSP processor with the appropriate analog sampling circuitry controlled by the microprocessor via control input 209. The sampling circuitry would be comprised of an Analog to Digital (A/D) converter, a low pass filter and audio buffers. The demodulated information is coupled through the data output 211 to the microprocessor, which processes the demodulated information, such as the delay equalization measurement information, as will be described in detail below.

Figure 12:
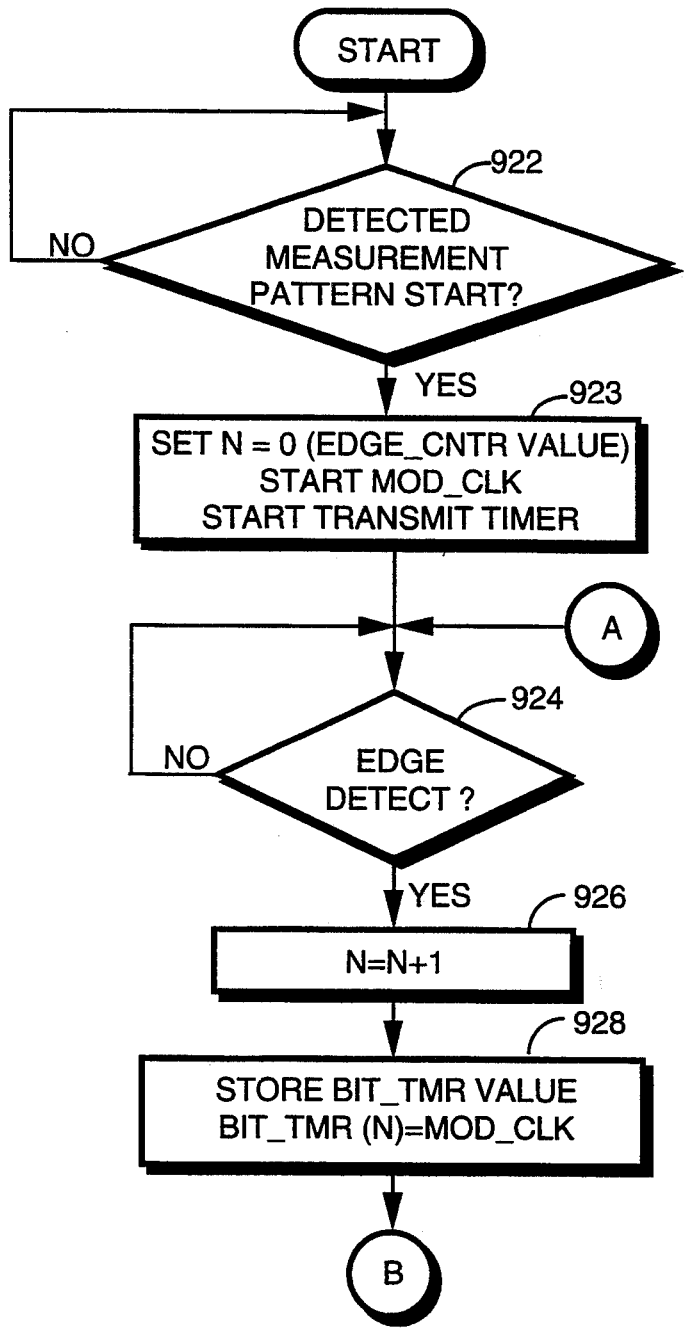
FIG. 12 is a flow chart depicting preamble detection and correction pattern capture during adaptive demodulation for transmission path delay measurements in accordance with an alternate embodiment of the present invention.

FIG. 12 is a flow chart depicting preamble detection and edge time stamping of the delay measurement signal during adaptive demodulation for transmission path delay measurements in accordance with the alternate embodiment of the present invention. The control station periodically transmits the delay measurement signal to one or more base stations. The repeat period is predetermined and understood by all receiving stations or the transmission time is transmitted to the base stations prior to or after delay measurement signal transmission. This repeat period or transmission time is the expected detect time value (EDT) and when compared to the sync detect time value (SDT), the base stations can detect delay changes.

Continuing with FIG. 12, when the delay measurement signal preamble is detected 922 an edge counter (N) within the controller is initialized, the modulo clock (MOD_CLK) is started and a transmit timer is started 923. When the transmit timer times out before the synchronization pattern is received, the measurement process is terminated, as the measurement was probably corrupted somewhere along the transmission path and the measurement could not be completed. The transmit timer is preferably set to a time sufficient to ensure complete capture of the delay measurement signal. Edge detection monitoring begins 924, and when an edge is detected 924, the edge counter value (N) is incremented 926, and the modulo clock value at the time of the edge detection is stored and identified by the corresponding edge counter value (BIT_TMR(N)) 928. Whether or not a data edge is detected 924, process flow continues to FIG. 13, at which time the number of edge detections is checked 944, and when sixty-four edges have been detected, the process flow returns to step 924.

Figure 13:
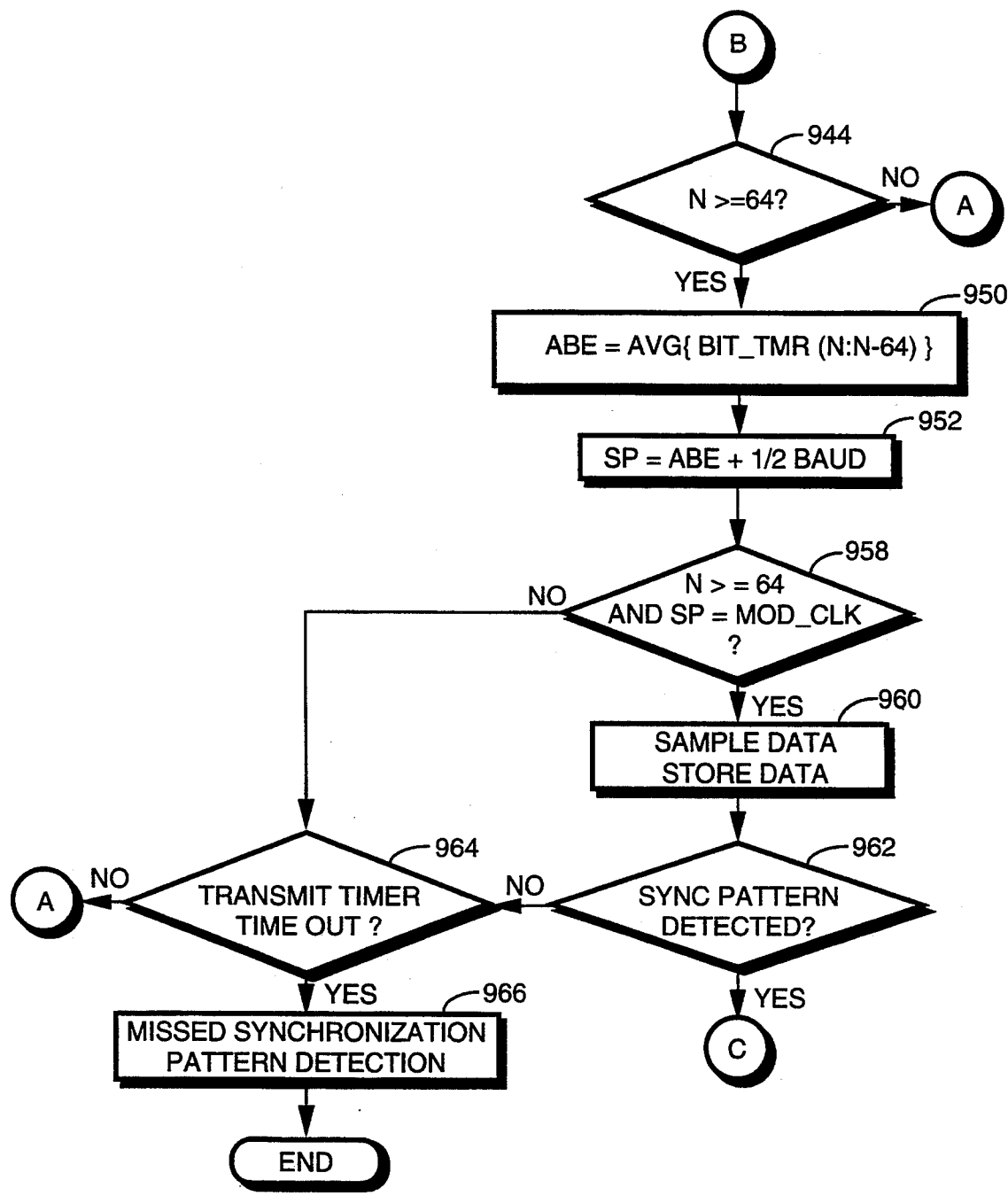
FIG. 13 is a flow chart depicting pseudo-synchronous demodulation for transmission path delay measurements in accordance with the alternate embodiment of the present invention.

Continuing in FIG. 13, once sixty-four bit edges have been detected 944 an average bit edge (ABE) is calculated as the modulo average of the most recent 64 edges 950 and a sample point (SP) is calculated from the new ABE 952. Until 64 edges are captured process flow returns to FIG. 12. It will be appreciated that fewer or greater bit edge detections can be monitored to establish the ABE value, and that the accuracy of the ABE and SP value is a function of the number of bit edges detected.

Continuing in FIG. 13, the modulo clock value is compared to the SP value 958, and until the modulo clock equals the SP value, the transit timer in monitored for time out 964. When the modulo clock equals the SP value, the received data is sampled and then stored 960. A subset of the stored data values is then compared with the synchronization (sync) pattern, in a manner well known by one of ordinary skill in the art, to determine whether the sync pattern has been detected 962. When the sync pattern is detected 962, program flow moves to step 974 in FIG. 14. When the sync pattern is not detected 962, the transmit timer is checked 964 to determine whether the transmit timer has timed out. Should the transmit timer time out 964, an indication 966 is provided that the synchronization pattern was not received and detected within the transmit time-out time and the delay measurement sequence for the base station is terminated. The delay measurement sequence for the base station can be immediately repeated upon detection of another preamble. If the transmit timer has not timed out 764, process flow returns to FIG. 12.

In summary, pseudo-synchronous demodulation is accomplished by calculating a rolling average bit edge (ABE) value from the edge times measured by the modulo clock using the most recent sixty-four edges. Each new edge results in a new average bit edge. In this way, the demodulator is locked to the baud rate of the incoming signal, and by using the calculated ABE, a sample point (SP) is set up at the bit center to derive the correct data polarity from the asynchronous waveform, and a data bit can be extracted.

Figure 14:
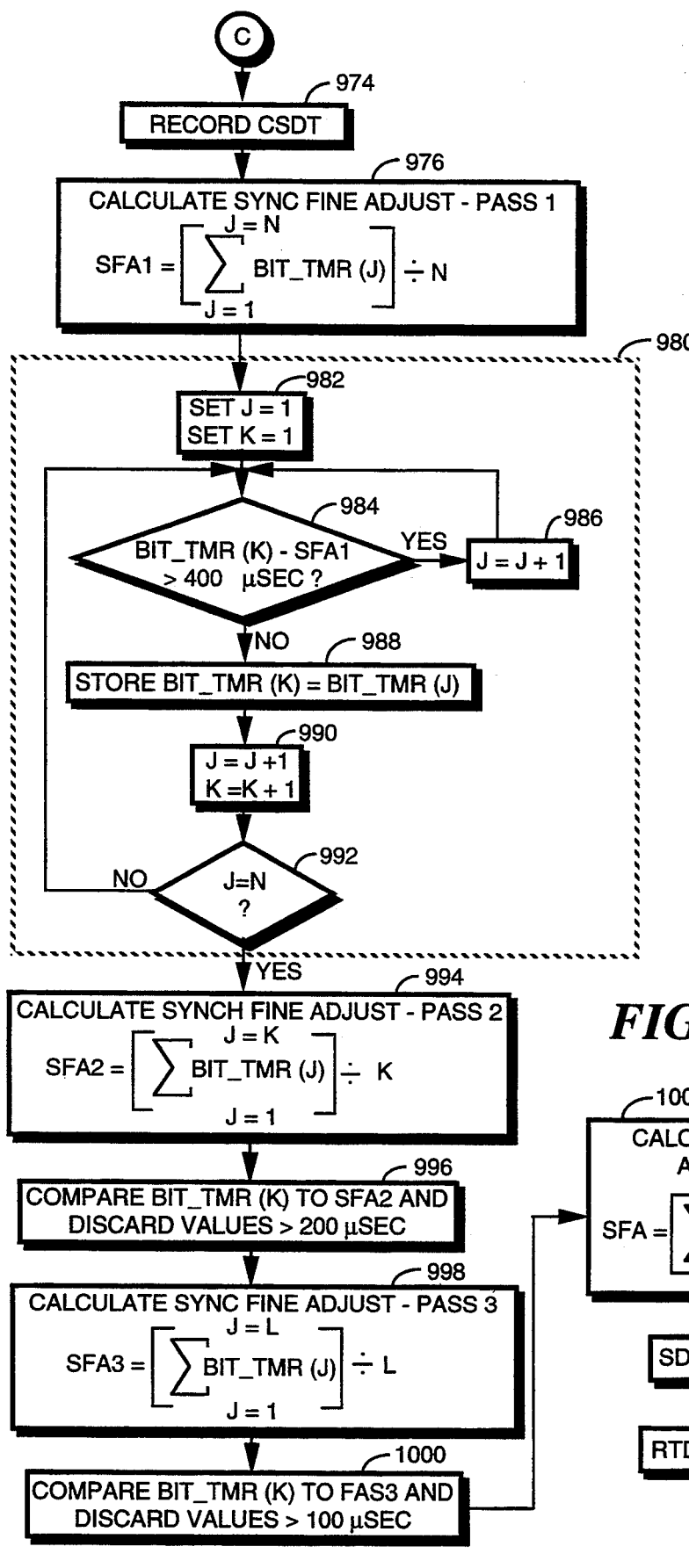
FIG. 14 is a flow chart depicting fine timing correction of the transmission path delay measurements in accordance with the alternate embodiment of the present invention.

FIG. 14 is a flow chart depicting fine time correction of the transmission path delay measurements in accordance with the alternate embodiment of the present invention. When the synchronization pattern is detected 962 of FIG. 13, the coarse synchronization detect time (CSDT) value is set equal to the real time of detection of the last bit of the synchronization pattern 974. A first pass fine sync adjustment calculation is then performed 976, by computing the modulo average of all N stored edge times to obtain a first sync fine adjust value (SFA1). Consequently, it will be appreciated that the accuracy of the first sync fine adjust value (SFA1) can be controlled by the number of bits transmitted within the correction pattern portion of the ADEQ measurement signal. The first sync fine adjust value (SFA1) is used to eliminate errant bit edge detections such as generated by injected bits. An errant bit elimination routine 980 is next performed. Sorting parameters (J and K) are set to one 982, and the SFA1 value is subtracted from the first stored bit time value (BI- T_TMR(1)) and compared to a first predetermined difference value, which in the preferred embodiment of the preferred invention is 400 microseconds (μSec) 984. When the difference between the stored bit time value (BIT_TMR(N)) and the first sync fine adjust value (SFA1) exceeds 400 μSec 984, the bit count index (J) is incremented 986, and the next bit count value is processed 984. When the difference between the stored bit time value (BIT_TMR(N)) and the first sync fine adjust value is not greater than 400 μSec 984, the bit timer value is stored (STORE_BIT_TMR) 988. The bit count index (J), and a bit time index (K) are then incremented by one 990, and the bit count index (J) is compared to the correction pattern edge count at step 792. When the bit count index (J) is less than N at step 992, steps 984 through 992 are repeated until all bit time values are processed, and errant bit times are eliminated.

A second sync fine adjust value (SFA2) is then calculated 994 using the stored bit time values remaining from the first elimination process (STORE_BIT_TMR). The second sync fine adjust value (SFA2) is then subtracted from each of the original N stored bit times (BIT_TMR), and the differences are compared to a second predetermined difference value, which in the preferred embodiment of the present invention is 200 μSec. All bit time values having differences greater than 200 μSec are then eliminated, and the remaining values are stored in STORE_BIT_TMR 996, as described above.

A third sync fine adjust value (SFA3) is then calculated 998 using the stored bit time values remaining from the second elimination process (STORE_BIT_TMR). The third sync fine adjust value (SFA3) is then subtracted from each of the original N stored bit times (BIT_TMR), and the differences are compared to a third predetermined difference value, which in the preferred embodiment of the present invention is 100 μSec. All bit time values having differences greater than 100 μSec are then eliminated, and the remaining values are stored in STORE_BIT_TMR 800, as described above.

A final sync fine adjust value (SFA) is then calculated 1002 using the stored bit time values remaining from the third elimination process (STORE_BIT_TMR). The final sync fine adjust value (SFA) computed enables a sync detect time value (SDT) to be calculated 1004 as the coarse sync detect time (CSDT) minus the sync final adjust value (SFA). The sync detect time value (SDT) calculated corresponds to locating the last bit of the sync pattern with accuracy up to an order of magnitude better than derived from the time established by the coarse sync detect time. The delay change value (DC) is finally calculated 1006 as the sync detect time value (SDT) minus the expected delay time value (EDT).

In summary, once the sync pattern has been detected, the coarse delay time value is corrected using the bit times from all stored edges of the correction burst. An initial average is calculated of all the captured edge times. A second average is calculated of all values with 400 microseconds of the first average. A third average is then calculated of all values within 200 microseconds of the second average. A final average is then calculated from all values within 100 microseconds of the third average. This value is used to fine adjust the coarse delay time measured. In the preferred embodiment of the present invention, at least one hundred (100) edge time values must remain for calculating the final edge time value. If at least 100 edge time values remain, the fine correction value is considered valid, and is used to correct the measured coarse delay time value. Once the measured coarse delay time value is corrected, the delay change for the base station is established. Using the delay change value the base station can compensate for the delay change itself automatically or notify the control station of the delay change and wait for authorization.

A method and apparatus for performing transmission path delay measurements using adaptive demodulation has been described, and enables equalizing base stations within a simulcast transmission system to at least an order of magnitude improvement over prior art transmission path delay measurements. The adaptive demodulation format utilized enables distinguishing extremely poor measurements from adequate measurements, thereby minimizing false readings during the transmission delay measurement process. It will be appreciated, that while the adaptive demodulation format has been described to enable performing the transmission path delay measurements, the same adaptive demodulation format can be utilized in a receiver to enable receiving asynchronous data, without the need for intricate clock timing adjustments.

We claim:

1. A method for measuring transmission path delays within a simulcast communication system comprising a control station and a plurality of remote transmission stations, said method comprising the steps of:

transmitting, from the control station, a delay equalization measurement signal including at least a correction bit pattern signal followed by a synchronization pattern signal;

receiving, at a selected one of the plurality of remote transmission stations, the delay equalization measurement signal and re-transmitting the same;

receiving the re-transmitted delay equalization measurement signal at the control station;

correlating the received synchronization pattern signal to obtain a coarse time of reception at the control station;

analyzing the received correction bit pattern signal to derive a fine reception time correction factor; and correcting the coarse time of reception with the fine reception time correction factor to obtain a corrected time of reception of the delay equalization measurement signal at the control station.

2. The method for measuring transmission path delays in a communication system according to claim 1, further comprising the steps of:

recording the time of transmission of the delay equalization measurement signal from the control station; and computing a difference between the time of transmission and the corrected time of reception of the delay equalization measurement signal to derive a round trip transmission delay time for the selected remote transmission station.

3. The method for measuring transmission path delays in a communication system according to claim 2, further comprising the step of computing a difference between the round trip transmission delay time for the selected remote transmission station and an airtime correction factor to obtain a variable path delay time for the selected remote transmission station.

4. The method for measuring transmission path delays in a communication system according to claim 1, wherein the control station demodulates the received delay equalization measurement signal to recover alternating rising and falling signal edges and includes timing means for generating timing signals, said method further comprising the steps of:

detecting signal edges within the demodulated alternating rising and falling signal edges;

determining arrival times of detected signal edges; and storing, in a first table, the arrival times of detected signal edges.

5. The method for measuring transmission path delays in a communication system according to claim 4, wherein said step of analyzing further comprises the steps of:

recovering the stored first table;

deriving a first time average from the arrival times recovered from the first table;

comparing the arrival times recovered from the first table with the first time average derived; and storing in a second table those arrival times of detected signal edges which differ from the derived time average by less than a first predetermined time difference.

6. The method for measuring transmission path delays in a communication system according to claim 5, wherein said step of analyzing further comprising the steps of:

recovering the stored first and second tables;

deriving a second time average from the arrival times recovered from the second table;

comparing the arrival times recovered from the first table with the second time average derived; and storing in a third table those arrival times of detected signal edges which differ from the second time average derived by less than a second predetermined time difference, the second predetermined time difference being less than the first predetermined time difference.

7. The method for measuring transmission path delays in a communication system according to claim 6, wherein said step of analyzing further comprising the steps of:

recovering the stored first and third tables;

deriving a third time average from the arrival times recovered from the third table;

comparing the arrival times recovered from the first table with the third time average derived; and storing in a fourth table those arrival times of detected signal edges which differ from the third time average derived by less than a third predetermined time difference, the third predetermined time difference being less than the second predetermined time difference.

8. The method for measuring transmission path delays in a communication system according to claim 7, wherein said step of analyzing further comprising the steps of:

recovering the stored fourth table of arrival times; and deriving a final time average from the arrival times recovered from the fourth table to derive the fine reception time correction factor.

9. A simulcast transmission system utilizing adaptive demodulation to provide automatic delay equalization measurement, said simulcast transmission system comprising:

a remote transmission station capable of retransmitting a received delay equalization measurement signal which includes at least a correction bit pattern signal followed by a synchronization pattern signal; and a control station comprising means for transmitting the delay equalization measurement signal, means for receiving the re-transmitted delay equalization measurement signal, means for correlating the received synchronization pattern signal to obtain a coarse time of reception thereof, means for analyzing the received correction bit pattern signal to derive a fine reception time correction factor, and means for correcting the coarse time of reception with the fine reception time correction factor to obtain a corrected time of reception of the delay equalization measurement signal at the control station.

10. The simulcast transmission system according to claim 9, wherein the simulcast transmission system comprises a plurality of remote transmission stations, and wherein said control station further comprises means for selecting at least one of said plurality of remote transmission stations from which the delay equalization measurement signal is to be re-transmitted.

11. The simulcast transmission system according to claim 10, wherein said control station further comprises:

means for recording the time of transmission of the delay equalization measurement signal; and means for computing a difference between the time of transmission and the corrected time of reception of the delay equalization measurement signal to derive a round trip transmission delay time for the selected remote transmission station.

12. The simulcast transmission system according to claim 11, wherein said control station further comprises means for computing a difference between the round trip transmission delay time for the selected transmission station and an airtime correction factor to obtain a variable path delay time for the selected remote transmission station.

13. The simulcast transmission system according to claim 9, wherein said control station further comprises:

means for demodulating the received delay equalization measurement signal to recover alternating rising and falling signal edges;

timing means for generating timing signals;

means for detecting signal edges within the demodulated alternating rising and falling signal edges;

means for determining arrival times of detected signal edges; and means for storing in a first table, the arrival times of detected signal edges.

14. The simulcast transmission system according to claim 9, wherein said means for analyzing comprises:

means for recovering the stored first table;

means for deriving a time average from the recovered arrival times recovered from the first table;

means for comparing the arrival times recovered from the first table with the first time average derived; and means for storing in a second table those arrival times of detected signal edges which differ from the derived time average by less than a first predetermined time difference.

15. The simulcast transmission system according to claim 14, wherein said means for recovering recovers said stored first and second tables,
said means for deriving further derives a second time average from the arrival times recovered from the second table,
said means for comparing further compares the arrival times recovered from the first table with the second time average derived, and
said means for storing stores in a third table those arrival times of detected signal edges which differ from the second time average derived by less than a second predetermined time difference, the second predetermined time difference being less than the first predetermined time difference.

16. The simulcast transmission system according to claim 15, wherein said means for recovering recovers said stored first and third tables,
said means for deriving further derives a third time average from the arrival times recovered from the third table,
said means for comparing further compares the arrival times recovered from the first table with the third time average derived, and
said means for storing stores in a fourth table those arrival times of detected signal edges which differ from the third time average derived by less than a third predetermined time difference, the third predetermined time difference being less than the second predetermined time difference.

17. The simulcast transmission system according to claim 16, wherein said means for recovering further recovers the stored fourth table of arrival times, and
said means for deriving further derives a final time average from the arrival times recovered from the fourth table to derive the fine reception time correction factor.

18. A method for measuring transmission path delays within a simulcast communication system comprising a control station having a master clock and a plurality of remote transmission stations having slave clocks, said method comprising the steps of:
transmitting from the control station at predetermined transmission times established by the master clock, a delay equalization measurement signal including at least a correction bit pattern signal followed by a synchronization pattern signal;
receiving the delay equalization measurement signal at the plurality of remote transmission stations;
correlating the received synchronization pattern signal to obtain a coarse time of reception established by the slave clocks at the plurality of remote transmission stations;
analyzing the received correction bit pattern signal to derive a fine reception time correction factor;
adjusting the coarse time of reception established by the slave clocks by the fine reception time correction factor to obtain an adjusted time of reception of the delay equalization measurement signal established by the slave clocks;
comparing the adjusted time of reception established by the slave clocks with the expected time of arrival to derive arrival time offsets; and
correcting the delay established at the remote transmission stations by the derived arrival time offsets to adjust for changes in transmission path delays.

19. The method for measuring transmission path delays in a communication system according to claim 18, wherein the plurality of remote transmission stations demodulates the received delay equalization measurement signal to recover alternating rising and falling signal edges and includes timing means for generating timing signals, said method further comprising the steps of:
detecting signal edges within the demodulated alternating rising and falling signal edges;
determining arrival times of detected signal edges; and
storing, in a first table, the arrival times of detected signal edges.

20. The method for measuring transmission path delays in a communication system according to claim 18, wherein said step of analyzing further comprises the steps of:
recovering the stored first table;
deriving a first time average from the arrival times recovered from the first table;
comparing the arrival times recovered from the first table with the first time average derived; and
storing in a second table those arrival times of detected signal edges which differ from the derived time average by less than a first predetermined time difference.

21. The method for measuring transmission path delays in a communication system according to claim 20, wherein said step of analyzing further comprising the steps of:
recovering the stored first and second tables;
deriving a second time average from the arrival times recovered from the second table;
comparing the arrival times recovered from the first table with the second time average derived; and
storing in a third table those arrival times of detected signal edges which differ from the second time average derived by less than a second predetermined time difference, the second predetermined time difference being less than the first predetermined time difference.

22. The method for measuring transmission path delays in a communication system according to claim 21, wherein said step of analyzing further comprising the steps of:
recovering the stored first and third tables;
deriving a third time average from the arrival times recovered from the third table;
comparing the arrival times recovered from the first table with the third time average derived; and
storing in a fourth table those arrival times of detected signal edges which differ from the third time average derived by less than a third predetermined time difference, the third predetermined time difference being less than the second predetermined time difference.

23. The method for measuring transmission path delays in a communication system according to claim 22, wherein said step of analyzing further comprising the steps of:
recovering the stored fourth table of arrival times; and
deriving a final time average from the arrival times recovered from the fourth table to derive the fine reception time correction factor.

24. A simulcast transmission system utilizing adaptive demodulation to provide automatic delay equalization measurement, said simulcast transmission system comprising:

a control station comprising
 a master clock for generating timing signals,
 means, responsive to the timing signals for transmitting a delay equalization measurement signal which includes at least a correction bit pattern signal followed by a synchronization pattern signal at predetermined transmission times; and a plurality of remote transmission stations, comprising
 slave clock for generating timing signals,
 means, responsive to the timing signals, for receiving the transmitted delay equalization measurement signal,
 means, responsive to the timing signals, for correlating the received synchronization pattern signal to obtain a coarse time of reception established by the slave clock,
 means for analyzing the received correction bit pattern signal to derive a fine reception time correction factor,
 means for adjusting the coarse time of reception established by the slave clocks with the fine reception time correction factor to obtain an adjusted time of reception of the delay equalization measurement signal established by the slave clocks,
 means for comparing the adjusted time of reception established by the slave clocks with the expected time of arrival to derive arrival time offsets, and
 means for correcting the delay established at the remote transmission stations by the derived arrival time offsets to adjust for changes in transmission path delays.

25. The simulcast transmission system according to claim 24, wherein said plurality of remote transmission stations further comprise;
 means for demodulating the received delay equalization measurement signal to recover alternating rising and falling signal edges;
 means for detecting signal edges within the demodulated alternating rising and falling signal edges;
 means for determining arrival times of detected signal edges; and
 means for storing in a first table, the arrival times of detected signal edges.

26. The simulcast transmission system according to claim 24, wherein said means for analyzing comprises:
 means for recovering the stored first table;
 means for deriving a time average from the recovered arrival times recovered from the first table;
 means for comparing the arrival times recovered from the first table with the first time average derived; and
 means for storing in a second table those arrival times of detected signal edges which differ from the derived time average by less than a first predetermined time difference.

27. The simulcast transmission system according to claim 26, wherein said means for recovering recovers said stored first and second tables,
 said means for deriving further derives a second time average from the arrival times recovered from the second table,
 said means for comparing further compares the arrival times recovered from the first table with the second time average derived, and
 said means for storing further stores in a third table those arrival times of detected signal edges which differ from the second time average derived by less than a second predetermined time difference, the second predetermined time difference being less than the first predetermined time difference.

28. The simulcast transmission system according to claim 27, wherein said means for recovering recovers said stored first and third tables,
 said means for deriving further derives a third time average from the arrival times recovered from the third table,
 said means for comparing further compares the arrival times recovered from the first table with the third time average derived, and
 said means for storing further stores in a fourth table those arrival times of detected signal edges which differ from the third time average derived by less than a third predetermined time difference, the third predetermined time difference being less than the second predetermined time difference.

29. The simulcast transmission system according to claim 28, wherein said means for recovering further recovers the stored fourth table of arrival times, and
 said means for deriving further derives a final time average from the arrival times recovered from the fourth table to derive the fine reception time correction factor.

30. A communication receiver for use in a communication system which transmits an information signal including at least a first timing portion followed by a second information portion, the information signal being encoded as a plurality of information bits, said communication receiver comprising:
 means for receiving the transmitted information signal;
 means for detecting information bit transitions within said timing portion, and for detecting arrival times thereof;
 means for computing an average bit edge arrival time for the number of arrival times detected;
 means for computing a sampling point related to the average bit edge arrival time; and
 means for sampling the information bits received in the first and second information portions at the computed sampling points to detect the information bits contained therein.

31. The communication receiver according to claim 30, wherein said first timing portion includes a correction bit pattern signal.

32. The communication receiver according to claim 30, wherein said first timing portion includes at least a portion of said second information portion.

33. The communication receiver according to claim 30, wherein said second information portion includes a data packet.

34. The communication receiver according to claim 30, wherein said second information portion includes a data synchronization pattern.

35. The communication receiver according to claim 30, wherein said means for computing the average bit edge arrival time computes a rolling average bit edge arrival time as additional information bit transitions are detected.

* * * * *